US007702639B2

(12) United States Patent
Stanley et al.

(10) Patent No.: US 7,702,639 B2
(45) Date of Patent: Apr. 20, 2010

(54) SYSTEM, METHOD, SOFTWARE ARCHITECTURE, AND BUSINESS MODEL FOR AN INTELLIGENT OBJECT BASED INFORMATION TECHNOLOGY PLATFORM

(75) Inventors: Robert A. Stanley, Emeryville, CA (US); Erich A. Gombocz, San Francisco, CA (US)

(73) Assignee: IO Informatics, Inc., Berkeley, CA (US)

( * ) Notice: Subject to any disclaimer, the term of this patent is extended or adjusted under 35 U.S.C. 154(b) by 177 days.

(21) Appl. No.: 11/217,796

(22) Filed: Aug. 31, 2005

(65) Prior Publication Data

US 2005/0289166 A1    Dec. 29, 2005

(51) Int. Cl.
*G06F 17/00* (2006.01)
*G06F 17/30* (2006.01)
(52) U.S. Cl. .............................. 707/100; 707/10; 707/3; 707/102
(58) Field of Classification Search ........................ None
See application file for complete search history.

(56) References Cited

U.S. PATENT DOCUMENTS

| 5,596,744 A | 1/1997 | Dao et al. |
| 5,634,015 A | 5/1997 | Chang et al. |
| 5,664,066 A | 9/1997 | Sun et al. |
| 5,664,215 A | 9/1997 | Burgess et al. |
| 5,706,453 A | 1/1998 | Cheng et al. |

(Continued)

FOREIGN PATENT DOCUMENTS

EP        0809198 A2    11/1997

| EP | 1030252 A1 | 8/2000 |
| WO | WO 0039709 A1 | 7/2000 |
| WO | WO 0065486 A2 | 11/2000 |

OTHER PUBLICATIONS

Papakonstantinou, et al., "Object Exchange Across Heterogeneous Information Sources", publ. date Jun. 3, 1995, pp. 251-260, Department of Computer Science, Stanford University, California.

(Continued)

*Primary Examiner*—Baoquoc N To
(74) *Attorney, Agent, or Firm*—Townsend and Townsend and Crew, LLP

(57) ABSTRACT

In one aspect, the invention provides an architecture and query and processing methodology, advantageously implemented in software, for an information technology platform using Intelligent Molecular Objects or objects of a more general character. In another aspect, it provides intelligent molecular object data or other data for heterogeneous data environments with high data density and dynamic application needs. In yet another, it provides an Object State Engine for intelligent molecular object data technology. In still another, it provides an Object Translation Engine for intelligent molecular object data in heterogeneous data environments with dynamic application needs. In yet another aspect, it provides a handling device including an Intelligent Object Handler for intelligent molecular object data in heterogeneous data environments with high data density and dynamic application needs. In even still another aspect, the invention provides a data pool architecture and an Intelligent Object Pool for intelligent molecular object data in heterogeneous data environments with high data density and dynamic application needs. An architecture for an information technology platform using Intelligent Molecular Object software is provided, which addresses all steps of data processing from data acquisition through diverse sources and instrumentation to final output of diverse data analysis results.

20 Claims, 19 Drawing Sheets

U.S. PATENT DOCUMENTS

| | | | |
|---|---|---|---|
| 5,745,895 | A | 4/1998 | Binghan et al. |
| 5,767,854 | A | 6/1998 | Anwar |
| 5,784,294 | A | 7/1998 | Platt et al. |
| 5,812,134 | A * | 9/1998 | Pooser et al. ............... 715/848 |
| 5,832,481 | A | 11/1998 | Sheffield |
| 5,832,484 | A | 11/1998 | Sankaran et al. |
| 5,842,031 | A | 11/1998 | Barker et al. |
| 5,862,325 | A | 1/1999 | Reed et al. |
| 5,867,799 | A | 2/1999 | Lang et al. |
| 5,873,097 | A | 2/1999 | Harris et al. |
| 5,937,189 | A | 8/1999 | Branson et al. |
| 5,964,891 | A | 10/1999 | Caswell et al. |
| 5,974,532 | A | 10/1999 | McLain et al. |
| 5,989,835 | A | 11/1999 | Dunlay et al. |
| 6,016,393 | A | 1/2000 | White et al. |
| 6,016,495 | A | 1/2000 | McKeehan et al. |
| 6,021,412 | A * | 2/2000 | Ho et al. ................... 707/104.1 |
| 6,035,300 | A | 3/2000 | Cason et al. |
| 6,038,393 | A | 3/2000 | Iyengar et al. |
| 6,041,398 | A | 3/2000 | Pechanek et al. |
| 6,052,722 | A | 4/2000 | Taghadoss |
| 6,064,382 | A | 5/2000 | Diedrich et al. |
| 6,076,088 | A | 6/2000 | Paik et al. |
| 6,078,924 | A | 6/2000 | Ainsbury et al. |
| 6,094,656 | A | 7/2000 | De Jong |
| 6,102,969 | A | 8/2000 | Christianson et al. |
| 6,105,030 | A | 8/2000 | Syed et al. |
| 6,108,661 | A | 8/2000 | Caron et al. |
| 6,111,893 | A | 8/2000 | Volftsun et al. |
| 6,119,126 | A | 9/2000 | Yee et al. |
| 6,125,383 | A | 9/2000 | Glynias et al. |
| 6,128,016 | A * | 10/2000 | Coelho et al. ............... 715/808 |
| 6,132,969 | A | 10/2000 | Stoughton et al. |
| 6,134,559 | A | 10/2000 | Brumme et al. |
| 6,134,581 | A | 10/2000 | Ismael et al. |
| 6,134,664 | A | 10/2000 | Walker |
| 6,136,274 | A | 10/2000 | Nova et al. |
| 6,137,499 | A | 10/2000 | Tesler |
| 6,138,171 | A | 10/2000 | Walker |
| 6,141,660 | A | 10/2000 | Bach et al. |
| 6,144,989 | A | 11/2000 | Hodjat et al. |
| 6,145,009 | A | 11/2000 | Miyazawa et al. |
| 6,146,027 | A | 11/2000 | Orton et al. |
| 6,148,298 | A | 11/2000 | LaStrange et al. |
| 6,161,148 | A | 12/2000 | Pratt et al. |
| 6,167,563 | A | 12/2000 | Fontana et al. |
| 6,305,007 | B1 | 10/2001 | Mintz |
| 6,704,726 | B1 | 3/2004 | Amouroux |

OTHER PUBLICATIONS

Sull, et al., "Manufacturing Information Integration Using an Object Orientated Knowledge Framework", Conference Proceedings: IEEE International Conference on Systems, Man, and Cybernetics, Oct. 13-16, 1991, pp. 443-448, University of Virginia.
America, P., Formal Aspects of Computing: Issues in the Design of a Parallel Object-Oriented Language [POOL], 1989, pp. 366-411.
Andreoli, J-M, et al., Research Directions in Concurrent Object-Oriented Programming, MIT Press, 1993, pp. 260-263.
Baker, M., Software Focus: Parallel Programming with Java, 2000.
Bertino, E., et al., Theory and Practice of Object Systems, 1999, pp. 125-197.
Cai, D., et al., International Journal of Intelligent Systems, 2000, pp. 745-761.
Caromel, D., et al., Parallel Programming Using C++, MIT Press, 1996, pp. 257-280.
Chalmers, M., Journal of the American Society for Information Science, 1999, pp. 1108-1118.
Chaudri, A.B., Theory and Practice of Object Systems, 1999, pp. 199-200.
Chaudri, A.B. et al., Theory and Practice of Object Systems, 1999, pp. 263-279.
Cooke, D.E., et al., Software: Practice and Experience, 2000, pp. 1541-1570.
Dao, et al., IEEE, 1991, pp. 88-91.
Demeyer, S., et al., Theory and Practice of Object Systems, 1999, pp. 73-81.
Gonzalez-Caetano, F.J. et al., Software: Practice and Experience, 2001, pp. 1-16.
Haas, L.M., et al., IBM Systems Journal, 2001, pp. 489-511.
Henry, J.E., Journal of Software Maintenance: Research and Practice, 2000, pp. 229-248.
Hert, C.A. et al., Journal of the American Society for Information Science, 2000, pp. 971-988.
Hobbs, D. W., Chemical and Engineering News, 2001, p. 266.
Hong-Taek Ju, International Journal of Network Management, 2000, pp. 261-275.
Hurd, J.M., Journal of the American Society for Information Science, 2000, pp. 1279-1283.
Lauro, C.N. et al., Applied Stochastic Models and Data Analysis: A multidimensional approach to conjoint analysis, 1998, pp. 265-274.
Lin, D., et al., American Genomic/Proteomic Technology, 2001, pp. 38-46.
Mattsson, M., et al., Journal of Software Maintenance: Research and Practice, 2000, pp. 79-102.
McClean, S., et al., International Journal of Intelligent Systems, 2000, pp. 535-547.
Meyer, B., IEEE Computer, 1999, pp. 139-140.
Segel, L.A., Complexity, 2000, pp. 39-46.
Siepel, A.C., et al., IBM Systems Journal, 2001, pp. 570-591.
Steiner, S., et al., Electrophoresis, 2000, pp. 2099-2104.
Teasley, S., et al., Science, Jun. 22, 2001, p. 2254.
Van Hemmen, L.J.G.T., International Journal of Network Management, 2000, pp. 299-314.
Williams, R.J., Neural Networks for Control, MIT Press, 1990, pp. 97-114.

* cited by examiner

IMO OSE State Lookup Table — 900

000 Object created

010 Data acquisition
011 DA in progress
012 DA interrupted
013 DA continued
014 DA completed 020 Data type definition
021 DT raw
022 DT matrix
023 DT structure
024 DT vector
025 DT pointer
026 DT path
027 DT binary
028 DT ASCII 040 Bio-Calibrations
041 C quantitation
042 C molecular weight
043 C isoelectric point
044 C enzyme-activity
045 C immunological activity
046 C other bio-activity 050 Image-Calibrations
051 C optical density (OD)
052 C fluorescence intensity
053 C luminescence intensity
054 C white balance
055 C light intensity
056 C dynamic range verification 060 Measurement-Calibrations
061 C origin
062 C size x
063 C size y
064 C position x
065 C position y
066 C position z
067 C length
068 C width
069 C depth 070 Annotations
071 Descriptive text
072 Base Designation (DNA sequence)
073 Aminoacid designation (protein sequence)
074 Molecule function
075 Molecular structure 080 Functionality information
081 Organism
082 Metabolic phase
083 Disease relationship 100 Standardization/normalization
101 STD threshold
102 STD base function (e.g., baseline)
103 STD base plane (e.g., 3D space)
14x STD all 04x (Bio; e.g., 141 STD quantitation)
15x STD all 05x (Image; e.g., 152 STD fluorescence intensity)

300 Experiment validation
301 Invalid conditions
302 Invalid experiment
303 Invalid interpretation
304 Invalid analysis tool applied
310 Unsure result
311 Unsure conditions
312 Unsure method
320 Validated method
321 Validated analysis
333 Validated experiment
340 Forensic experiment
350 Certified experiment 400 Output request
410 Numerical output generated
411 Graphical output generated
420 Remote output sent
430 Output printed 900 Access information
901 Access denied
902 Time limit exceeded
903 User limit exceeded
910 Inter-object communication granted
911 User access to object granted
920 Full access to object granted

FIG. 9

Object:

| State | User/level | Network | Date/time stamp | (Explanation) |
|---|---|---|---|---|
| 000 | RAS/05 | 00220 | 12/20/2000 14:33:05 | (object created) |
| 011 | WUD/02 | 00220 | 12/20/2000 14:33:07 | (data: acquisition in progress) |
| 014 | WUD/02 | 00220 | 12/20/2000 16:53:07 | (data: acquisition completed) |
| 022 | WUD/02 | 00220 | 12/20/2000 16:55:22 | (data: matrix defined) |
| 056 | GOT/03 | 00220 | 12/21/2000 08:00:57 | (image: dynam. range verified) |
| 052 | GOT/03 | 00220 | 12/21/2000 08:01:46 | (image: fluoresc. intens. calib.) |
| 041 | GOT/03 | 00220 | 12/21/2000 08:16:31 | (bio: quantitation calib.) |
| 061 | GOT/03 | 00220 | 12/21/2000 08:18:58 | (image: origin calib.) |
| 062 | GOT/03 | 00220 | 12/21/2000 08:20:25 | (image: size x calib.) |
| 063 | GOT/03 | 00220 | 12/21/2000 08:23:19 | (image: size y calib.) |
| 101 | GOT/03 | 00220 | 12/21/2000 08:25:44 | (std/norm: detection threshold) |
| 164 | GOT/03 | 00220 | 12/21/2000 08:41:12 | (std/norm: measurement x) |
| 165 | GOT/03 | 00220 | 12/21/2000 08:45:30 | (std/norm: measurement y) |
| 901 | KRE/05 | 00080 | 12/21/2000 08:45:31 | (access denied) |
| 911 | AAH/02 | 04092 | 12/21/2000 08:45:44 | (user: access to object granted) |
| 071 | AAH/02 | 04092 | 12/21/2000 08:45:50 | (anno: descript. text) |
| 024 | GOT/03 | 00220 | 12/21/2000 08:52:12 | (data: vector defined) |
| 911 | BLD/03 | 00693 | 12/21/2000 09:02:36 | (user: access to object granted) |
| 073 | BLD/03 | 00693 | 12/21/2000 09:02:39 | (anno: AA protein sequence) |
| 045 | GOT/03 | 00220 | 12/21/2000 09:14:08 | (bio: immunol. activity) |
| 046 | GOT/03 | 00220 | 12/21/2000 09:39:41 | (bio: other bio-activity) |
| 410 | GOT/03 | 00220 | 12/21/2000 09:42:31 | (output: numerical output) |
| 411 | GOT/03 | 00220 | 12/21/2000 09:44:07 | (output: graphical output) |
| 430 | GOT/03 | 00220 | 12/21/2000 09:42:31 | (output: printed) |

SYSTEM, METHOD, SOFTWARE ARCHITECTURE, AND BUSINESS MODEL FOR AN INTELLIGENT OBJECT BASED INFORMATION TECHNOLOGY PLATFORM

RELATED APPLICATIONS

Priority is hereby claimed under 35 U.S.C. 120 and/or 35 U.S.C. 119(e) to the following United States Provisional and Utility Patent Applications, each of which is hereby incorporated by reference: U.S. Utility patent application Ser. No. 10/010,754 filed 6 Dec. 2001 and entitled Data Pool Architecture, System, And Method For Intelligent Object Data In Heterogeneous Data Environments; U.S. Utility patent application Ser. No. 10/010,724 filed 6 Dec. 2001 and entitled Intelligent Molecular Object Data Structure and Method for Application in Heterogeneous Data Environments with High Data Density and Dynamic Application Needs; U.S. Utility patent application Ser. No. 10/010,727 filed 6 Dec. 2001 and entitled Intelligent Object Handling Device and Method for Intelligent Object Data in Heterogeneous Data Environments with High Data Density and Dynamic Application Needs; U.S. Utility patent application Ser. No. 10/010,086 filed 6 Dec. 2001 which issued as U.S. Pat. No. 6,988,109 on Jan. 17, 2006 and entitled System, Method, Software Architecture, And Business Model For An Intelligent Object Based Information Technology Platform; U.S. Provisional Application Ser. No. 60/254,063 filed Dec. 6, 2000 entitled Data Pool Architecture for Intelligent Molecular Object Data in Heterogeneous Data Environments with High Data Density and Dynamic Application Needs; U.S. Provisional Application Ser. No. 60/254,062 filed Dec. 6, 2000 entitled Intelligent Molecular Object Data for Heterogeneous Data Environments with High Data Density and Dynamic Application Needs; U.S. Provisional Application Ser. No. 60/254,064 filed Dec. 6, 2000 entitled Handling Device for Intelligent Molecular Object Data in Heterogeneous Data Environments with High Data Density and Dynamic Application Needs; U.S. Provisional Application Ser. No. 60/259,050 filed Dec. 29, 2000 entitled Object State Engine for Intelligent Molecular Object Data Technology; U.S. Provisional Application Ser. No. 60/264,238 filed Jan. 25, 2001 entitled Object Translation Engine Interface For Intelligent Molecular Object Data; U.S. Provisional Application Ser. No. 60/266,957 filed Feb. 6, 2001 entitled System, Method, Software Architecture and Business Model for an Intelligent Molecular Object Based Information Technology Platform; U.S. Provisional Application Ser. No. 60/276,711 filed Mar. 16, 2001 entitled Application Translation Interface For Intelligent Molecular Object Data In Heterogeneous Data Environments With Dynamic Application Needs; U.S. Provisional Application Ser. No. 60/282,656 filed Apr. 9, 2001 entitled Result Generation Interface For Intelligent Molecular Object Data In Heterogeneous Data Environments With Dynamic Application Needs; U.S. Provisional Application Ser. No. 60/282,658 filed Apr. 9, 2001 entitled Knowledge Extraction Engine For Intelligent Object Data In Heterogeneous Data Environments With Dynamic Application Needs; U.S. Provisional Application Ser. No. 60/282,654 filed Apr. 9, 2001 entitled Result Aggregation Engine For Intelligent Object Data In Heterogeneous Data Environments With Dynamic Application Needs; U.S. Provisional Application Ser. No. 60/282,657 filed Apr. 9, 2001 entitled Automated Applications Assembly Within Intelligent Object Data Architecture For Heterogeneous Data Environments With Dynamic Application Needs; U.S. Provisional Application Ser. No. 60/282,655 filed Apr. 9, 2001 entitled System, Method And Business Model For Productivity In Heterogeneous Data Environments; U.S. Provisional Application Ser. No. 60/282,979 filed Apr. 10, 2001 entitled Legacy Synchronization Interface For Intelligent Molecular Object Data In Heterogeneous Data Environments With Dynamic Application Needs; U.S. Provisional Application Ser. No. 60/282,989 filed Apr. 10, 2001 entitled Object Query Interface For Intelligent Molecular Object Data In Heterogeneous Data Environments With Dynamic Application Needs; U.S. Provisional Application Ser. No. 60/282,991 filed Apr. 10, 2001 entitled Distributed Learning Engine For Intelligent Molecular Object Data In Heterogeneous Data Environments With Dynamic Application Needs; and U.S. Provisional Application Ser. No. 60/282,990 filed Apr. 10, 2001 entitled Object Normalization For Intelligent Molecular Object Data In Heterogeneous Data Environments With Dynamic Application Needs; each of which U.S. utility and U.S. provisional patent application is hereby incorporated by reference in its entirety.

FIELD OF INVENTION

This invention pertains generally to system, method, computer program product, data structure and architecture, data management, and software architecture; and more particularly to system, method, computer program product, and data structure and architecture, data management, and software architecture in the life sciences, biotechnology, therapeutic diagnostic and intervention, pharmaceuticals, and bioinformatics.

BACKGROUND

As demand for Information Technology (IT) software and hardware to provide global data access and integrated business solutions has exploded, significant challenges have become evident. A central problem poses access, integration, and utilization of large amounts of new and valuable information generated in each of the major industries. Lack of unified, global, real-time data access and analysis is detrimental to crucial business processes, which include new product discovery, product development, decision-making, product testing and validation, and product time-to-market.

With the completion of the sequence of the human genome and the continued effort in understanding protein expression in the life sciences, a wealth of new genes are being discovered that will have potential as targets for therapeutic intervention. As a result of this new information, however, Biotech and Pharmaceutical companies are drowning in a flood of data. In the Life Sciences alone, approximately 1 Terabyte of data is generated per company and day, of which currently the vast majority is unutilized for several reasons.

First, data are contained in diversified system environments using different formats, heterogeneous databases and have been analyzed using different applications. These applications may each apply different processing to those data. Competitive software, based on proprietary platforms for network and applications analysis, have utilized data platform technologies such as SQL with open database connectivity (ODBC), component object model (COM), Object Linking and Embedding (OLE) and/or proprietary applications for analysis as evidenced in patents from such companies as Sybase, Kodak, IBM, and Cellomics in U.S. Pat. No. 6,161,148, U.S. Pat. No. 6,132,969, U.S. Pat. No. 5,989,835, U.S. Pat. No. 5,784,294, for data management and analysis, each of which patents are hereby incorporated by reference. Because of this diversity, despite the fact, that the seamless integration of public, legacy and new data is crucial to efficient drug discovery and life science research, current data mining tools cannot handle all data simultaneously. There is a significant lack of data handling methods, which can utilize these data in a secure, manageable way. The shortcomings of these technologies are evident within heterogeneous software and hardware environments with global data resources. Despite the fact that the seamless integration of public, legacy and new data is crucial to efficient research (particularly in the life sciences), product discovery (such as for example drug, or treatment regime discovery) and distribution, current data mining tools cannot handle or validate all diverse data simultaneously.

Second, with the expansion of high numbers of dense data in a global environment, user queries often require costly massive parallel or other supercomputer-oriented processing in the form of mainframe computers and/or cluster servers with various types of network integration software pieced together for translation and access functionality as evidenced by such companies as NetGenics, IBM and ChannelPoint in U.S. Pat. No. 6,125,383 U.S. Pat. No. 6,078,924, U.S. Pat. No. 6,141,660, U.S. Pat. No. 6,148,298, each of which patents are herein incorporated by reference—(e.g. Java, CORBA, "wrapping", XML) and networked supercomputing hardware as evidenced by such companies as IBM, Compaq and others in patents such as for example U.S. Pat. No. 6,041, 398, U.S. Pat. No. 5,842,031, each of which is hereby incorporated by reference. Even with these expensive software and hardware infrastructures, significant time-delays in result generation remain the norm.

Third, in part due to the flood of data and for other reasons as well, there is a significant redundancy within the data, making queries more time consuming and less efficient in their results.

Fourth, an additional consideration, which is prohibitive to change towards a more homogenous infrastructure, is cost. The cost to bring legacy systems up to date, to retool a company's Intranet based software systems, to carry out analysis with existing tools, or even to add new applications can be very expensive. Conventional practices require retooling and/or translating at application and hardware layers, as evidenced by such companies as Unisys and IBM in U.S. Pat. No. 6,038,393, U.S. Pat. No. 5,634,015.

Because of the constraints outlined above, it is nearly impossible to extract useful, relevant information from the entity of data within reasonable computing time and efforts. For this reason, the development of architecture to overcome these obstacles is needed.

These are not the only limitations. With the advent of distinct differentiations in the field of genomics, proteomics, bioinformatics and the need for informed decision making in the life sciences, the state of object data is crucial for their overall validation and weight in complex, multi-disciplinary queries. This is even more important due to inter-dependencies of a variety of data at different states. Furthermore, because biological data describe a "snapshot" of complex processes at a defined state of the organism, data obtained at any time refer to this unique phase of metabolism. In order to account for meaningful comparison, thus, only data in similar states can be utilized. Therefore, there is a growing need for a object data state processing engine, which allows to continuously monitor, govern, validate and update the data state based on any activities of intelligent molecular objects in real-time.

Data translation processes between different data types are time-consuming and require provision of information on data structure and dependencies, in spite of advances in information technology. These processes, although available and used, have a number of shortcomings. Data contained in diversified system environments may use different formats, heterogeneous databases and different applications, each of which may apply different processing to those data. Because of that, despite the fact that the seamless integration of public, legacy and new data is crucial to efficient drug discovery and life science research, several different applications and/or components have to be designed in order to translate each of those data sets correctly. These require significant effort and resources in both, software development and data processing. With the advent of distinct differentiations in the field of genomics, proteomics, bioinformatics and the need for informed decision making in the life sciences, access to all data is crucial for overall validation and weight in complex, multi-disciplinary queries. This is even more important due to inter-dependencies of a variety of data at different states. The current individual data translation approach does not support these needs. Because biological data describe a "snapshot" of complex processes at a defined state of the organism, data obtained at any time refer to this unique phase of metabolism. In order to account for meaningful comparison, thus, only data in similar states can be utilized. The latter requires real-time processing and automated, instant data translation of data from different sources. Therefore, there is a growing need for an object data translation engine, which allows for bi-directional translation of multidimensional data from various sources into intelligent molecular objects in real-time.

The flood of new and legacy data results in a significant redundancy within the data making queries more time consuming and less efficient in their results. There is a lack of defined sets of user interaction and environment definition protocols, which are needed to provide means for intelligent data mining and optimization in result validation towards real solutions and answers. An additional consideration, which is prohibitive to change towards a more homogeneous infrastructure is the missing of object representation definition protocols to prepare and present data objects for interaction within heterogeneous environments. Lastly, data currently are interacted with and presented in diverse user interfaces with dedicated, unique features and protocols preventing universal, unified user access. Thus, a homogeneous, unified presentation such as a web-enabled graphical user interface which integrates components from diverse applications and laboratory systems environments is highly desirable, but currently non-existent for objects in real-time.

Because of these constraints, it is nearly impossible to extract useful, relevant information from the entity of data within reasonable computing time and efforts. For this reason, the development of an architecture and unifying user interface to overcome these obstacles is needed.

Relevant Patents

U.S. Pat. No. 6,136,274, U.S. Pat. No. 6,125,383, U.S. Pat. No. 6,052,722, U.S. Pat. No. 6,016,495, U.S. Pat. No. 5,937,189, U.S. Pat. No. 5,596,744, U.S. Pat. No. 5,867,799, U.S. Pat. No. 5,745,895, U.S. Pat. No. 6,076,088, U.S. Pat. No. 5,706,453, U.S. Pat. No. 5,767,854, U.S. Pat. No. 6,035,300, U.S. Pat. No. 6,145,009, U.S. Pat. No. 5,974,532, U.S. Pat. No. 5,873,097, U.S. Pat. No. 6,094,656, U.S. Pat. No. 6,136,274, U.S. Pat. No. 6,138,171,U.S. Pat. No. 6,144,989, U.S. Pat. No. 6,137,499, U.S. Pat. No. 6,016,393. U.S. Pat. No. 6,145,009, U.S. Pat. No. 6,167,563, U.S. Pat. No. 6,144,989, U.S. Pat. No. 6,134,664, U.S. Pat. No. 6,125,383, U.S. Pat. No. 6,111,893, U.S. Pat. No. 6,108,661, U.S. Pat. No. 6,102,969, U.S. Pat. No. 6,078,924, U.S. Pat. No. 6,076,088, U.S. Pat. No. 5,964,891, U.S. Pat. No. 5,937,189, U.S. Pat. No. 5,745,895, U.S. Pat. No. 5,664,215, U.S. Pat. No. 6,052,722,

U.S. Pat. No. 6,064,382, U.S. Pat. No. 6,134,581, U.S. Pat. No. 6,146,027, U.S. Pat. No. 5,664,066, U.S. Pat. No. 5,862,325, U.S. Pat. No. 6,016,495, U.S. Pat. No. 6,119,126.

Relevant Literature

Elisa Bertino, Susan Urban, Elke A. Rundensteiner (eds.): Theory and Practice of Object Systems (1999) 5 (3): 125-197; Akmal B. Chaudhri, Julie A. McCann, Peter Osmon: Theory and Practice of Object Systems (1999) 5 (4): 263-279; D. Cai, M. F. McTear, S. I. McClean: International Journal of Intelligent Systems (2000): 15 (8): 745-761; Carol A. Hert, Elin K. Jacob, Patrick Dawson: Journal of the American Society for Information Science (2000) 51 (11): 971-988. F. J. González-Castaño, L. Anido-Rifón, J. M. Pousada-Carballo, P. S. Rodríguez-Hernández, R. López-Góm: Software: Practice and Experience (2001) 31 (1): 1-16; Daniel E. Cooke, Per Andersen: Software: Practice and Experience (2000) 30 (14): 1541-1570; Akmal B. Chaudhri: Theory and Practice of Object Systems (1999) 5 (4): 199-200; Lee A. Segel: Complexity (2000) 5 (6): 39-46; L. J. G. T. van Hemmen: International Journal of Network Management (2000) 10 (6): 261-275. Joel E. Henry: *Journal of Software Maintenance: Research and Practice* (2000) 12 (4): 229-248; Michael Mattsson, Jan Bosch: *Journal of Software Maintenance: Research and Practice* (2000) 12 (4): 79-102; Sally Mcclean, Bryan Scotney, Mary Shapcott: *International Journal of Intelligent Systems* (2000) 15 (6): 535-547; Julie M. Hurd: *Journal of the American Society for Information Science* (2000) 51 (14): 1279-1283; Serge Demeyer, Matthias Rieger, Theo Dirk Meijler, Edzard Gelsema: *Theory and Practice of Object Systems* (1999) 5 (2): 73-81; Dao et al: *IEEE* (1991): 88-91. Joel E. Henry: *Journal of Software Maintenance: Research and Practice* (2000) 12 (4): 229-248; Michael Mattsson, Jan Bosch: *Journal of Software Maintenance: Research and Practice* (2000) 12 (4): 79-102; Sally Mcclean, Bryan Scotney, Mary Shapcott: *International Journal of Intelligent Systems* (2000) 15 (6): 535-547; Julie M. Hurd: *Journal of the American Society for Information Science* (2000) 51 (14): 1279-1283; Serge Demeyer, Matthias Rieger, Theo Dirk Meijler, Edzard Gelsema: *Theory and Practice of Object Systems* (1999) 5 (2): 73-81. Mark Baker: Software Focus: Parallel programming with Java (2000) 1 (1); C. N. Lauro, G. Giordano, R. Verde: Applied Stochastic Models and Data Analysis: A multidimensional approach to conjoint analysis (1998) 14 (4): 265-274; P. America: Formal Aspects of Computing: Issues in the Design of a Parallel Object-Oriented Language [POOL] (1989) 1 (4): 366-411.

SUMMARY

The invention has numerous aspects. In one aspect, the invention provides an architecture and query and processing methodology, advantageously implemented in software, for an information technology platform using Intelligent Molecular Objects (IMO). In another aspect, the invention provides intelligent molecular object (IMO) data for heterogeneous data environments with high data density and dynamic application needs. In yet another aspect, the invention provides an Object State Engine (OSE) for intelligent molecular object data technology. In still another aspect, the invention provides an Object Translation Engine (OTE) for intelligent molecular object data in heterogeneous data environments with dynamic application needs. In yet another aspect, the invention provides a handling device including an Intelligent Object Handler (IOH) for intelligent molecular object data in heterogeneous data environments with high data density and dynamic application needs. In even still another aspect, the invention provides a data pool architecture and an Intelligent Object Pool (IOP) for intelligent molecular object data in heterogeneous data environments with high data density and dynamic application needs. These and other aspects are described in greater detail below as well as in the detailed description hereinafter relative to the figures.

A software architecture for an information technology platform using "Intelligent Molecular Object" (IMO™) software is provided, which addresses all steps of data processing from data acquisition through diverse sources and instrumentation to final output of diverse data analysis results. The architecture's data elements are uniquely defined data objects, Intelligent Molecular Objects (IMOs), consisting of sets of functional property pane layers, activated or disabled via a property pane controller. Each IMO contains a unique identifier for object data access and security, and property pane layers defining the origin of the object and routing content and results interactively across the network. Status management components on the object level provide real-time control of object activity, activity records logging, data integrity monitoring, state management for network object data, GLP/GMP compliant state assignment and information request ranking. Status management processing engines also handle external query submission and result synchronization for inter-object queries, allowing the IMOs to communicate intelligently via vectorized, direct addressing of data subsets, and keeping track of their interactions. Meta-data indices, workspace-oriented vector subsets and object pane descriptors allow for fast, direct communication with diversified applications and databases via an object query interface and integrated application translator links. Processing engines are included to standardize and/or normalize data from diverse sources, providing a means to accurately compare data, to test for identity, for increase or decrease in values or functional relevancy. In particular, algorithms for tracking and normalization of object or image data are provided which allow to extract variable and non-variable regions within sets of data and generate a global standard to which all data can be referred. By applying these algorithms, adjustments to all necessary parameters in a multidimensional data set can be made automatically and simultaneously. In addition, functionality is provided for direct information interchange between objects, graphical preview of the object data, raw data matrix structure descriptions, and the like.

Further described is an applications framework within the IMO technology, called "Intelligent Object Handler" (IOH), which provides sets of user interactions and object environment definition protocols. The described IOH is comprised of sets of processing engines and access interfaces, which prepare and present IMO data objects for interaction within heterogeneous environments. A unified presentation layer within the IOH provides a web-enabled graphical user interface, which integrates components or modules from diverse applications and laboratory systems environments, and acts as a handler for IMO data. Additional IOH components include a user definition administration shell, a master query component and an interface to automate the query of application and database requirements. The creation and initiation of new IMOs is provided via an integrated IMO generator. A direct instrument acquisition and control interface and a component for automated application assembly provide integration of real-time data acquisition and analysis. Data type translators are provided to automate transformation from heterogeneous data sources into IMO data in real-time. Automated normalization of data, by calibration with empirical criteria within the workspace standardization technique referred to above, is managed through pointers to meta-data tags and vector subsets. An integrated object translation engine processes interactions such as transformation, integration and information access between intelligent object data and other data environments to enable real-time communication. These processes automatically determine other data structures, look up functional information of the data, create descriptors which correspond to object property pane layers and determine application type and access to IMOs in real-time. Analytical functionality is provided by access interfaces and processing engines integrated at the IOH level. These engines and interfaces provide secure access to multidimensional queries across heterogeneous environments and synchronization with offline legacy systems. Real-time result generation and engines for distributed learning and knowledge extraction also reside within the IOH.

The IMO IT architecture provides also processes, which define and govern a global virtual data pool, the "Intelligent Object Pool" (IOP). These processes contain definitions for subsets, called Intra-Pools (iPools), which are regulated by pool boundary protocols. iPool security authentication, availability monitoring, object persistence and integrity assessment components are provided. Interfaces for meta-data queries are integrated within the IOP, such as interactive presorting and exclusion algorithms, object clustering and object-to-object interaction rules. Content access definitions such as object-to-analysis tools interactions, result merging algorithms and a real-time answer generator are also integrated at the IOP level. Rapid, relevant data access is enabled through object-to-object and iPool-to-iPool meta-data indexed access, and iPool integrity assessment. Additionally, pool content access protocols and order definitions allow for object property-selective pre-sorting, real-time result aggregation and real-time exclusion of irrelevant object data layers. Other components include pool exchange protocols, real-time meta-data links and indexing, queries across pools and several tools for meta-data index and significance aggregation in real-time. Functions are also provided to define the proximity of individual IMO data within the IOP. Thus, the IOP provides an engine for global result aggregation across diversified data subsets.

Methods are provided for: object data creation and identification; root data and meta-data content routing; data status management; meta-data indexing; and object query and response management for diversified data in networked Life Sciences applications environments. Intelligent Molecular Object (IMO) technology improves data usability and rate of access to query-relevant elements, attributes and other "meta-data" (data about the data). The technology provides real-time access to previously unusable data and significantly reduces response time for queries of large datasets. The technology provides data management and access across hardware and software platforms and research applications. The technology secures data for global network use and exchange, and provides extensible options, including ownership management, data integrity, use-tracking, and selective access. Data object handling and storage technology for customization, analysis, and exchanged is provided.

Methods and functions are provided for: a continuously running (always-on) set of processes, which comprise an intelligent object state engine to monitor and govern activities of intelligent molecular objects in real-time, including a component to trigger the creation of a new object and assign a unique identifier to it; a component, which monitors any object activity or transaction with the object and records its activity history; a component, which relates activities to GLP/GMP-compliant data states and assigns a defined state to the object to validate the current action; a component, which governs access to the object and object-to-object activities based on security protocols and privilege definitions; a status memory for state-less networks, which transmits action consequences back to the backend system; a validation state based information exchange ranking component; a state-related vector definition of object data subsets for dynamic information interchange; and, a query processing component for handling external query submissions to the object and object-to-object query result synchronization.

Methods and functions are provided for sets of event-driven processes, which comprise an intelligent real-time translation engine for integration of intelligent molecular objects within heterogeneous data environments with dynamic application needs. The methods and functions include: a component which carries out data table extraction to determine data object, data field and raw data matrix definitions for intelligent molecular objects; a component which provides data object, data field and raw data matrix structure definition tables for intelligent molecular objects; a component which provides data structure information for standardization of non-object data; a component which carries out data type extraction to determine data access and structure dependencies for intelligent molecular objects; a component which provides data type, access and structure definition tables for intelligent molecular objects; a component which carries out database type extraction to determine database access and structure dependencies for intelligent molecular objects; a component which provides database type, access and structure definition tables for intelligent molecular objects; a component which carries out application type extraction to determine application type, access and structure for intelligent molecular objects; a component which provides application type, access and structure definition tables for intelligent molecular objects; a component which provides table lookup to provide real-time translation of the intelligent molecular object within heterogeneous database and application environments; and, a component to provide intelligent molecular object pane presentation in real-time, according to defined data structure, database, and application requirements.

Methods are provided for: unified presentation and management of user definition, administration and security protocols; definition of user interaction and computing environment protocols; and definition of data type translation protocols. Additional methods are provided for real-time generation of Intelligent Molecular Object (IMO) data; data object standardization; and definition of object representation for unified data acquisition, management and analysis in heterogeneous data environments with high data density and dynamic application needs. The Intelligent Object Handler (IOH) technology presents a unified and web-enabled user environment which fields queries and commands and presents significant analytical results in real-time via meta-data protocols. The technology described automates data acquisition and transformation from heterogeneous data sources and/or types to an empirically normalized, meta-data indexed Intelligent Molecular Object (IMO) data standard. The technology described herein makes diverse data accessible to analysis by heterogeneous application types, providing a secured, unified, web-enabled environment for real-time, integrated acquisition and analysis of previously heterogeneous data.

Methods are provided for a meta-data enhanced storage and analytical resource for Intelligent Molecular Object (IMO) data. The Data Pool Architecture defined herein enables Intelligent Molecular Objects to communicate via active object algorithms. The technology defined herein provides boundary protocols for secure integration and access to global and/or local data pools; and content access definitions for real-time significance detection and results generation. The technology defined herein provides automated meta-data indexing and object-to-object query result aggregation for real-time answers to queries within heterogeneous data environments with high data density and dynamic application needs.

BRIEF DESCRIPTION OF THE FIGURES

FIG. 9 is an example list of common state designations for life science applications.

FIG. 10 is an example of an object state history, comprised of time-sequential set of object activity records (OAR).

DETAILED DESCRIPTION OF EXEMPLARY EMBODIMENTS

Figure 1:
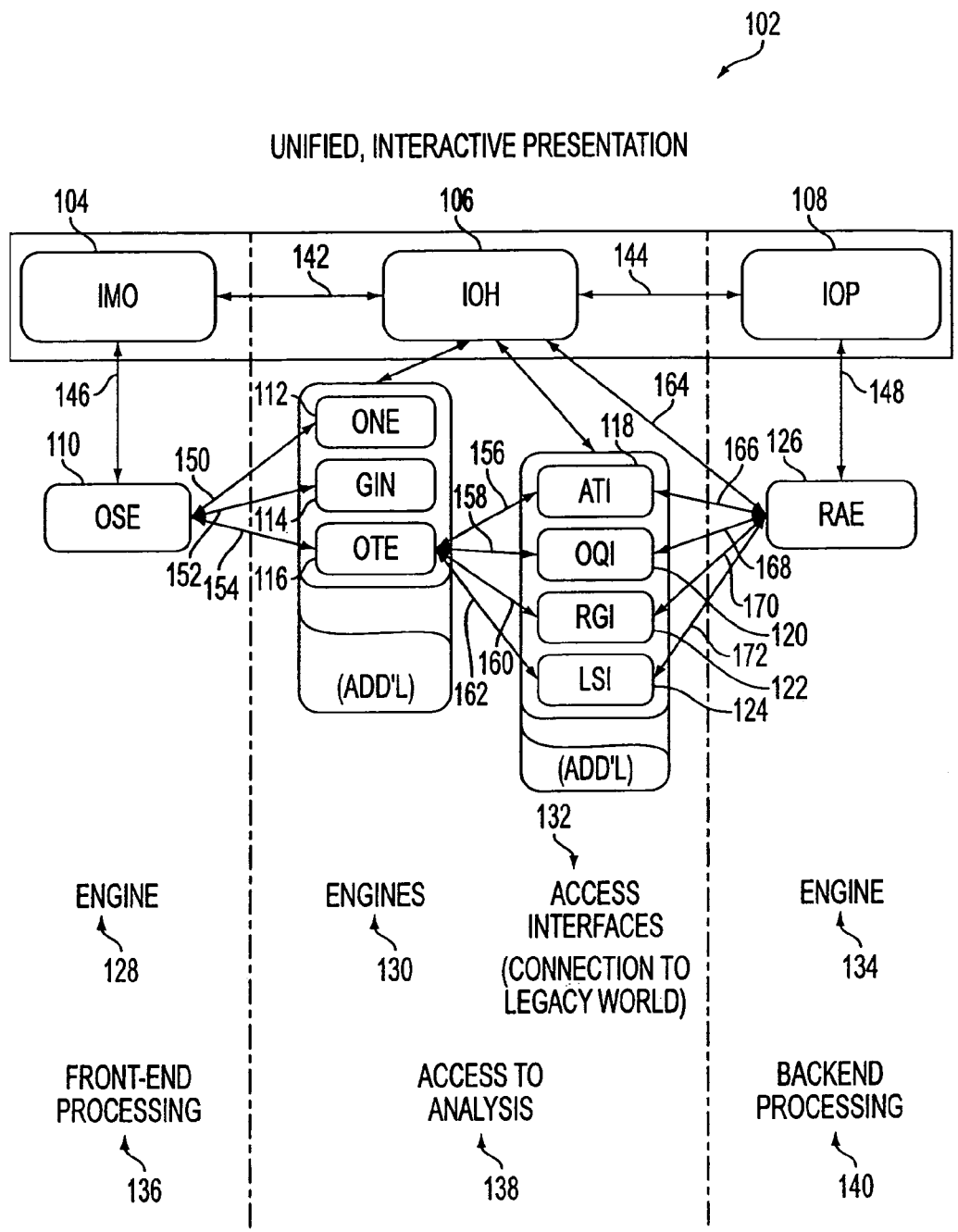
FIG. 1 is a representation of the general IMO IT architecture, depicting relationships between framework, engines, interfaces and other components.

The inventive Intelligent Molecular Object Information Technology (IMO IT) Platform and its constituent subsystems, methods, procedures, and computer software algorithms, solves the diversified data and format as well as the heterogeneous database and applications problems by integrating unique components, processes, engines and interfaces such as networked data type, database, and application type detection and table generation, coupled with multidimensional table lookup and pointers. These components, processes, engines and interfaces work within the IMO IT architecture at the data object level to provide such advantages as automated, real-time access and translation capabilities, thus enabling instant handling of diverse data in heterogeneous applications environments.

The IMO IT Platform also solves these and other problems and limitations of conventional systems and methods by integrating unique components, processes, engines and interfaces such as workspace vector subset selection, dynamic meta-data indexing at the data object and data subset levels, as well as direct information interchange at the data object and data subset levels. These components, processes, engines and interfaces, work within the IMO IT architecture to provide significant advantages for efficient analysis of high numbers of high density data, allowing for true real-time data acquisition and analysis in a global data environment.

The IMO IT Platform technology, in contrast to conventional existing technologies described in the background, does not reproduce or alter the raw data in any way, thus eliminating data redundancy while simultaneously enabling multiple queries on a single data object simultaneously. By using meta-data reference tables, pointers and tags to provide real-time translation and integration, which efficiently refers only to the aspects of any raw data relevant to a specific query, the IMO IT Platform avoids data redundancy and data access locking requirements. This provides significant advantages over currently existing technologies as described by such companies as Oracle and Sybase, for example, in U.S. Pat. No. 6,105,030; U.S. Pat. No. 5,832,484; each of which is hereby incorporated by reference.

Furthermore, in contrast to the conventional practices requiring retooling and/or translating at application and hardware layers, described in the Background, the IMO IT Platform enables translation, applications integration and validation of existing systems, in real-time, at the data object level. This allows for efficient scalability, interoperability and applications development without retooling existing systems, and provides for data-enabled validation of existing hardware and software systems.

In one aspect, the inventive methods and procedures remedy these constraints and limitations by providing an architecture allowing interactive, object-based intelligent communication in-between the data itself to extract all relevant content in a fast, unique and automated manner, within complex network environments without the need of upgrading or replacing current computer systems.

These methods and procedures, also remedy these constraints and limitations by allowing interactive, object-based intelligent communication in-between the data itself to extract all relevant content in a fast, unique and automated manner, within complex network environments without the need of upgrading or replacing current computer systems. The intelligent molecular object technology provides a flexible global standard, which allows for seamless integration and real-time answers to complex, multidimensional and interdependent queries. The intelligent molecular object technology provides a framework for scale-up and dynamically changing application needs in bioinformatics and the life sciences.

They also remedy these constraints by allowing interactive, object-based intelligent communication between object data based on an unified presentation layer, an user definition and administration shell and an automated application/database definition generator interface which accounts for seamless integration into the intelligent molecular object technology.

They further remedy these constraints by allowing interactive, parallel, object-based intelligent communication in-between the data itself to extract all relevant content in a fast, unique and automated manner, within complex network environments without the need of upgrading or replacing current computer systems. The intelligent molecular object pool technology provides seamless integration and real-time answers to complex, multidimensional and interdependent queries, but still maintains boundaries of data subsets to govern a secure, inter-data communicative global access. The intelligent molecular object pool technology also provides a framework for scale-up and dynamically changing application needs in bioinformatics and the life sciences.

Some of the major subsystems and procedures contributing to this operation and the advantages that follow there from are now described in greater detail.

I. Software Architecture for an Information Technology Platform Using Intelligent Molecular Objects The software architecture for an information technology platform using Intelligent Molecular Object (IMO™) software and processing method addresses all steps of data processing from data acquisition through diverse sources and instrumentation to final output of diverse data analysis results.

In the first step, this technology uses engine components to standardize and/or normalize data from diverse sources to make those otherwise different data comparable. The engines provide a means to accurately compare, thus allowing one to test for identity, increase or decrease in values or functional relevancy and the like. In particular, algorithms for tracking and normalization of object data (Object Normalization Engine, ONE) or image data (Global Image Normalization, GIN) are provided. These algorithms allow one to extract variable and non-variable regions within a set of data and generate a global standard to which all data can be referred. By applying these algorithms, adjustments to all necessary parameters in a multidimensional data set can be made automatically and simultaneously. Within the described architecture, these algorithms can be applied in external modules or plug-in-format for other applications as well as for access via intranet or Internet.

Next, the architecture uses uniquely defined data objects, the "Intelligent Molecular Object" (IMO) as its data records. Each the object consists of sets of functional layers (property panes). These property panes are activated or disabled via a Property Pane Controller (PPC). Each object is represented by a Unique Identifiers (UID), which governs object data security and access permissions via the Object Access Manager (OAM), and additional layers which define origin of the object within the network (Object Root Router, ORR) and route content and results interactively (Interactive Content Router, ICR) across the network in a standardized fashion. A Status Management Component (SMC) monitors data integrity, command history and GLP/GMP-compliance via a table-based Object State Engine (OSE). The object state engine provides control for any object activity in real-time, logs activity records, provides GLP/GMP compliant experiment state assignment, state management for object data on the network, information request ranking and vectorized, direct addressing of data subsets (Vector Subsets, VSS) to minimize network traffic. This processing engine also handles external query submission and result synchronization for inter-object queries. All these processes allow the object to communicate intelligently via VSS, and keep track of their interactions. Using Meta-data Indices (MDX), workspace-oriented VSS and Object Pane Descriptors (OPD) accounts for quick and direct communication with diversified applications and databases via an Object Query Interface (OQI). An integrated Application Translator Link (ATL) communicating via the OAM allows for application integration. Additionally, functionality is provided for Direct Information Interchange (DII) between objects, graphical preview of the object data (Object Graph Preview, OGP) and raw data matrix structure description (Raw Data Matrix, RDM; Matrix Structure Definition, MSD).

Next, the architecture provides an applications framework within the IMO technology, the Intelligent Object Handler (IOH), describing sets of user interactions and object environment definition protocols. This IOH is comprised in general of a set of processing engines and access interface protocols. These protocols provide methods and functions for preparation and presentation of data objects (IMO Application Framework, IMO-A) for interaction within heterogeneous environments. A Unified Presentation Layer (UPL) within the IOH provides a web-enabled Graphical User Interface (GUI) to integrate components or modules from diverse applications, laboratory systems environments, and to act as handler for IMO data (IMO Handler, IMO-H). Additional components include a User Definition Administration Shell (UDA), a Master Query Component (MQC) and an interface to automate the query of application and database requirements via an Application Definition Generator (ADG). The creation and initiation of new IMO data is provided via an integrated IMO Generator (IMO-G). A Direct Instrument Acquisition & Control Interface (DIAC) and a component for Automated Application Assembly (AAA) provide integration of real-time data acquisition and analysis. Data Type Translators (DTT) are provided to integrate automated transformation from heterogeneous data sources into IMO data in real-time. Automated normalization of data by calibration with standardized empirical criteria within the workspace IMO Standardization Technique (IMO-S) is managed through integrated meta-data tags and pointers. Several access interfaces are also integrated at the IOH level. Next, an Object Translation Engine (OTE) is integrated, which governs interactions (such as transformation, integration and information access) between IMO data and other diverse data environments to enable real-time communication. Such processes automatically determine other data structures, look up functional information of the data, create descriptors which correspond to object property panes and determine application type and access to IMO's in real-time. All the engines and interfaces establish the connection to the legacy world and provide bi-directional, multidimensional, secure access to applications (Application Translation Interface, ATI), for queries via OQI, for result generation (Result Generation Interface, RGI) and for synchronization with offline legacy systems (Legacy Synchronization Interface, LSI). Additionally, learning engines such as a Knowledge Extraction Engine (KEE) or Distributed Learning Engine (DLE) and the like can be implemented within the IOH.

Next, the architecture provides processes, which govern a global virtual data pool, the Intelligent Object Pool (IOP). The processes contain definitions for subsets, called Intra-Pools (iPools) regulated by boundary protocols, which define integrity and persistence of IMO relationships. IOP components comprise iPool boundary interfaces, iPool meta-data query and content access interfaces and iPool content ordering definitions and protocols. iPool boundary interfaces include the iPool Security Authentication (iPSA) component, which provides security authentication; the iPool Integrity Assessment (iPIA) and Object Integrity Assessment (OIA) components, which provide data integrity and persistence;

and the iPool Availability Monitoring (iPAM) and iPool Exchange Protocols (iPEP) components, which define and control availability and exchange at the IMO level. IPool Meta data query definition interfaces are provided by Object-to-Object Query Meta-data (OQM), Real-Time Meta-data Link (RML), iPool Meta-data Index (iMDX), and iPool-to-iPool Query (PPQ) components. These processes apply interactive presorting and exclusion algorithms, provide object clustering, object result clustering and object-to-object interaction rules, and enable rapid, relevant data access via real-time meta-data queries ordered within the iPool on the IMO level. iPool content access and ordering definitions and protocols include an Aggregate Meta-data Index (aMDX), Aggregate Real-time Significance Generator (aRSG) which integrate result merging algorithms and real-time answer generation. These iPool content access protocols and order definitions allow for object-to-analysis tools interactions, real-time result aggregation and real-time exclusion of irrelevant object data layers. Additional components include an IMO Zoomer (IMO-Z), which defines the proximity of individual IMO data within the IOP and enables multidimensional IMO data viewing and functional ranking.

Through the functionality detailed above, the IOP provides an engine for global result aggregation (Result Aggregation Engine, RAE) and instant answer output across diversified data subsets and an interface to assess integrity of iPools within the virtual, global data pool.

Engines, interfaces and components comprising methods, functions, and definitions are provided, to define and describe a unique, data-enabling software architecture (IMO IT Platform). These engines, interfaces and components implement an information technology platform which utilizes Intelligent Molecular Object (IMO™) data and consists of a common framework comprising always-on as well as event-driven processing engines, access interfaces, plug-in modules and other components.

The IMO IT Platform architecture defined and described below addresses all steps of data processing from data acquisition through diverse sources and instrumentation to final output of diverse data analysis results reports.

The IMO IT Platform utilizes uniquely defined data objects, "Intelligent Molecular Object" data objects as its data records. Each IMO consists of sets of functional layers (property panes), describing content and providing certain functionalities to the object. These property panes are dynamically activated or disabled via a Property Pane Controller (PPC), function of which is to allow or block access based on user privileges, data pool definitions and the like.

Each IMO is represented by an Unique Identifier (UID) contained within the identity pane, so it can be addressed and identified on any network directly via its ID. The identity pane also governs object data security and access permissions via the Object Access Manager (OAM), an integrated part of the PPC to initiate object communication. Next, each IMO contains a layer, which contains information defining the origin of the object within the network (Object Root Router, ORR) and its owner. Next, each IMO contains a layer, which routes content and results interactively (Interactive Content Router, ICR) across the network using standardized protocols.

Next, a Status Management Component (SMC) monitors data integrity and command history in GLP/GMP-compliance via a table-based Object State Engine (OSE). The Object State Engine consists of processes which control any object activity in real-time, log activity records, provide GLP/GMP compliant experiment state assignment and state management for object data on stateless networks. In addition, the Object State Engine handles information request ranking and vectorized, direct addressing of data subsets (Vector Subsets, VSS) to minimize network traffic. This processing engine also handles external query submission and result synchronization for inter-object queries by providing routing, property pane access clearance and direct, workspace-oriented VSS addressing. All these processes allow the object to communicate intelligently via VSS, and keep track of their interactions.

Next, the IMO includes Meta-data Indices (MDX) layer for rapid access, and Object Pane Descriptors (OPD) which allow for quick and direct communication with diversified applications and databases via an Object Query Interface (OQI), which allows for object-level direct Information Interchange (DII) between objects.

An integrated Application Translator Link (ATL), communicating via the OAM and ICR, accounts for integration of external applications and/or remote application status inquiries. Next, functionality is provided for graphical preview of the object data (Object Graph Preview, OGP) and raw data matrix structure description (Raw Data Matrix, RDM; Matrix Structure Definition, MSD).

The architecture defines an applications framework within the IMO technology, the Intelligent Object Handler (IOH), which provides sets of user interactions and object environment definition protocols for the IMO data. This IOH is comprised in general of a set of processing engines and access interfaces. A Unified Presentation Layer (UPL) within the IOH provides a web-enabled Graphical User Interface (GUI), which integrates data, components and/or analytical and processing modules from diverse applications and laboratory systems environments. In general, these protocols provide for preparation and presentation of data objects for interaction within heterogeneous environments (IMO Application Framework, IMO-A).

To ensure automated, real-time normalization of data using one or several calibrations with empirical criteria within the workspace, the IMO Standardization Technique (IMO-S) is provided, which activates engine components for standardization and normalization through utilization of integrated meta-data tags and VSS pointers. These engine components are defined by the following methods and functions, which standardize and/or normalize data from diverse sources to make those otherwise different data comparable. The engines provide a means to accurately compare, thus allowing to test for identity, increase or decrease in values or functional relevancy and the like. The following algorithms for tracking, standardization and/or normalization of object data (Object Normalization Engine, ONE) or image data (Global Image Normalization, GIN) are defined. These algorithms allow for the extraction of variable and non-variable regions within a set of data and generate a global standard to which all data can be referred.

In the case of ONE, which is described in but not restricted to the following example in the field of Life Sciences, the data are comprised of numeric matrices, text annotations, chemical structure information, chirality information, spectral information, sequence information and the like.

In the case of GIN, described by but not limited to the following example in the field of Life Sciences, the data are information contained in fluorescent and/or otherwise visibly stained 1D or 2D gel electrophoresis images, array images, microscopic images and the like, all of which may differ in image acquisition parameters, detection technique, intensity, color, positional distortions of zones, bands, spot or other regular or irregular objects contained in the images which, in consequence, relate to certain macromolecule properties, such as size/molecular weight, isoelectric point, concentration, biological activity and the like. By applying algorithms, which define a vector subset for workspace selection in a single or a set of images, only those, typically relatively small areas of the images are processed which are needed to achieve relevant comparison. Such, data transfer between different objects and for temporary storage and processing via normalization, is reduced to the subsets for speed and efficiency. By reference to either a common, global standard or a dynamically obtained, averaged reference from all data included within the comparison query, adjustments to all necessary parameters in a multidimensional data set can be made automatically and simultaneously in parallel. Since those processes apply only to temporarily extracted small data subsets, several different request on the same object may be processed at the same time. Since in each case only vector subset are generated, no raw data alteration occurs and GLP/GMP-compliant data integrity is maintained. Within the described architecture; the algorithms can be applied as processing engines, in external modules or in plug-in-formats for other applications as well as for remote access via intranet or Internet.

Engines, interfaces and components provided within the IOH to provide an integrated analytical framework, including but not limited to the following. A User Definition Administration Shell (UDA) interface is provided, which creates, modifies and administers user profiles and privileges and defines rules for users within individual subsets of data, called Intra-Pools (iPools), as well as group memberships and topic-related access rights. A Master Query Component (MQC), is provided, which creates complex, multidimensional queries, containing pre-defined, configurable subsets of forms commonly used, but not restricted to, in diverse areas of Life Sciences. An Application Definition Generator (ADG) component is provided, which automates the query of application and database requirements and is comprised within related translation components to generate tables required for integrated real-time property pane presentation at the data object level. An IMO Generator (IMO-G) component is provided, which creates new IMO data from existing data resources, or from newly acquired instrumentation data. An IMO handler (IMO-H) component is provided, which initiates user commands and queries at the IMO level via the use of integrated meta-data tags and pointers. A Direct Instrument Acquisition & Control Interface (DIAC) is provided, which enables bi-directional real-time communication between the IOH, the IMO and diverse instrumentation. An Automated Application Assembly (AAA) component is provided, which enables integration of real-time data acquisition and analysis functionality through just-in-time (JIT) module linking. A Data Type Translation (DTT) component is provided, which integrates translation tables from the ADG from heterogeneous data sources into IMO data in real-time. The DTT are comprised of dynamically generated sets of reference tables to provide rapid access through data structure definitions.

Several engines and access interfaces integrated at the IOH level are defined, which utilize the meta-data tags and pointers to pass information between internal and external components. All the engines and interfaces establish the connection to the legacy world. An Object Translation Engine (OTE) is included, which governs interactions (such as transformation, integration and information access) between intelligent object data and other diverse data environments to enable real-time communication. Such processes automatically determine other data structures, look up functional information of the data, create descriptors which correspond to object property panes and determine application type and access to IMO's in real-time. An Application Translation Interface, (ATI) is defined, which provides bi-directional, multidimensional, secure access to applications for queries via OQI. A Result Generation Interface (RGI) is defined, which provides validated, assembled, ranked and tabulated results to the RAE, enabling the generation of output reports across diversified data subsets. A Legacy Synchronization Interface (LSI) is defined, which provides synchronization with offline legacy data. Additionally, learning engines such as a Knowledge Extraction Engine (KEE) or Distributed Learning Engine (DLE) and the like can be implemented within the IOH.

Next, the architecture provides the following interfaces, component processes and engines which enable and govern a global virtual data pool comprised of IMO data, the Intelligent Object Pool (IOP). The component processes contain definitions for subsets, called Intra-Pools (iPools), regulated by boundary protocols, which define integrity and persistence of IMO relationships. IOP components are defined, which comprise iPool boundary interfaces, iPool meta-data query and content access interfaces and iPool content ordering definitions and protocols.

iPool boundary interfaces are defined, which include the iPool Security Authentication (iPSA) component, which provides security authentication; the iPool Integrity Assessment (iPIA) and Object Integrity Assessment (OIA) components, which provide data integrity and persistence; and the iPool Availability Monitoring (iPAM) and iPool Exchange Protocols (iPEP) components, which define and control availability and exchange at the IMO level.

iPool Meta-data query definition interfaces are provided by Object-to-Object Query Meta-data (OQM), Real-Time Meta-data Link (RML), iPool Meta-data Index (iMDX), and iPool-to-iPool Query (PPQ) components. These processes apply interactive presorting and exclusion algorithms, provide object clustering, object result clustering and object-to-object interaction rules, and enable rapid, relevant data access via real-time meta-data queries ordered within the iPool on the IMO level.

iPool content access and ordering definitions and protocols are provided, which include an Aggregate Meta-data Index (aMDX), Aggregate Real-time Significance Generator (aRSG) which integrate result merging algorithms and real-time answer generation. These iPool content access protocols and order definitions allow for object-to-analysis tools interactions, real-time result aggregation and real-time exclusion of irrelevant object data layers, Additional components include an IMO Zoomer (IMO-Z), which defines the proximity of individual IMO data within the IOP and enables multidimensional IMO data viewing and functional ranking.

It is evident from the above description, that this IMO IT architecture allows for decision empowering, real-time answers to complex, multidimensional, interdependent queries by providing the infrastructure for a global, comprehensive analysis of otherwise not accessible vast, inconsistent sets of data.

The following examples are offered by way of illustration and not by way of limitation.

In a typical life sciences example, a 2-dimensional electrophoretic protein separation is carried out and the silver-stained separation pattern is introduced in an imaging workstation to obtain a high resolution, high dynamic range image representation of the spot pattern (typically, about 2500-6000 individual protein spots/image). Each of those spots represents a single protein at a defined expression stage in a specific cell environment, e.g. in this example, human liver cells. These pattern reflect also genetic differentiations and/or modifications, e.g. in case of human samples, the origin of the cell, gender, age, race, physical condition of the individual and the like.

It is obvious from the above, that such pattern represent in inherent multidimensional complexity, all of which even more expressed by laboratory-to-laboratory deviations in performing the analytical procedure, sometimes also on different types of instrumentation. To analyze such a pattern for, for instance the increase or decrease in concentration based on a pathological disease condition or for drug-induced changes on certain proteins in enzyme-immunological activity and the like, non-patient specific data have to be separated from those common in all pattern. A large series of such gels must be analyzed, standardized and compared to achieve this goal.

In the example, the IMO platform technology will do the following: A scientist on a laptop (1) in site A in the USA logs onto the IMO platform; the UDA within the IOH verifies the login, sets user permissions and encryption level, generates a session ID and starts a session for (1) in the IOH. Next, the scientist (1) uses the menu in the UPL to acquire instrument data, in this example gel image data. The DIAC within the IOH communicates with the imaging workstation (2) to remotely start image acquisition, the IMO-G creates a new data objects for the currently acquired image. This new IMO consists now of a UID pane, which uniquely identifies the IMO via a 10-character key across the network. The UID pane also defines object type, contains information about the origin (ORR) on the network (on 1), the owner (creator) of the IMO, how content (the raw image data in this case) is routed (ICR) interactively on the network (in this case, the raw image file at the imaging workstation (on 2)), of an OSE pane, in which the first 2 entries are created via the SMC (an object creation record, and the current data state entry, "data acquisition in progress", an indexed multi-digit number from the GLP/GMP state assessment table), a OPD pane describing which panes are functionally defined, a dynamically updated OGP (displaying a progressive thumbnail view of the image in real-time as it is acquired) and a RDM pane consisting essentially only of file type description and pointers to the original image file, thus there is no data redundancy anywhere on the entire network. When image acquisition is complete, the SMC on the IMO adds another status entry "data acquisition completed" to the IMO state history log and adds final data MSD's to the RDM pane.

Simultaneously, another scientist (3) in site 2 in Japan logs onto the IMO platform; the UDA within the IOH verifies the login, sets user permissions and encryption level, generates a session ID and starts a session for (3) in the IOH. Next, the scientist (3) uses the menu in the UPL to submit a global query about gel image data, in this case, describing a defined disease-related change in protein expression of peptides with an iso-electric points around 5.5 and a molecular size ranging between 80k DA-120k DA in liver cells from white, human males with an age above 50. The MQC within the IOH analyzes the query by providing the IMO-H with VSS for the appropriate workspace definitions within the 2D gel image data (based on the entered pI and size constraints, only a small fraction of each images is relevant to the query), which, in turn, gates the query to IMO's via OQI. Based on MDX links, the PPC will only inquire those iPools and IMO's with matching OPD's. The OAM on each such IMO checks access privileges, triggers the PPC, sends update request to the OSE, extracts partial image information from the original RDM for temporary storage to be processed via ONE and GIN for image workspace normalization and comparison. Standardized comparisons (in this case, the protein spot location in the individual IMO RDM subset, and its concentration, represented by its integrated, optical density calibrated intensity) within the VSS are reported back via ICR in each IMO to the RGI at the IOH level, which creates ranked output. Similarly, MDX-based, the OTE at the IOH level performs data translation of workspace data from other databases using the ATI to integrate those relevant data into the result-ranking. During this time, another scientist (4) in site B in the USA logs onto to the IMO platform, and performs a similar, but not identical query. The DLE immediately addresses the MQC to define a new VSS only within the already addressed, active IMO's RDX's. The RAE at the IOP aggregates the IMO results, sorts them based on relevancy and similarity, reports to the KEE and DLE for dynamic MDX update, and posts the final tabulated answer back to the IOH via RGI. Proximity of integrated data is related to the IMO-Z for graphical representation. The UPL now presents the aggregated, ranked answers to the query in several graphical and numerical windows to the scientist (3), including the newly generated image from scientist (1). On a different location and network, at the same time the local UPL in scientist's (4) computer displays the aggregated answer for his query. In the above example, for scientist (1) 212 peptides and for scientist (4) 96 peptides were identified, which differ in their expression level, amongst a set of >500000 relevant 2D gel images with approx. 3000 individual spots each.

It is noted, that in a conventional database environment, processing of the query would require the analysis of the entire gel images and their annotations, at the required resolution typically at file sizes around 2-5 MB each, and the alignment (normalization) of the image in its entity, thus, requiring enormous amounts of data to be processed. The IMO IT platform technology's dynamic workspace definitions via VSS reduces this so significantly, that alignment, matching and comparison are reduced to, in this example, about 40-60kB data each (or approximately, by 60-fold), allowing real-time result aggregation.

FIG. 1 is a representation of an embodiment of the general IMO IT architecture, depicting relationships between framework, engines, interfaces and other components. The depiction below is a representation of the general IMO IT architecture, depicting relationships between framework, engines, interfaces and other components. The vertical dividers represent, from left to right, front-end processing, access to analysis/applications, and back-end processing. All acronyms are explained elsewhere in this description.

Figure 2:
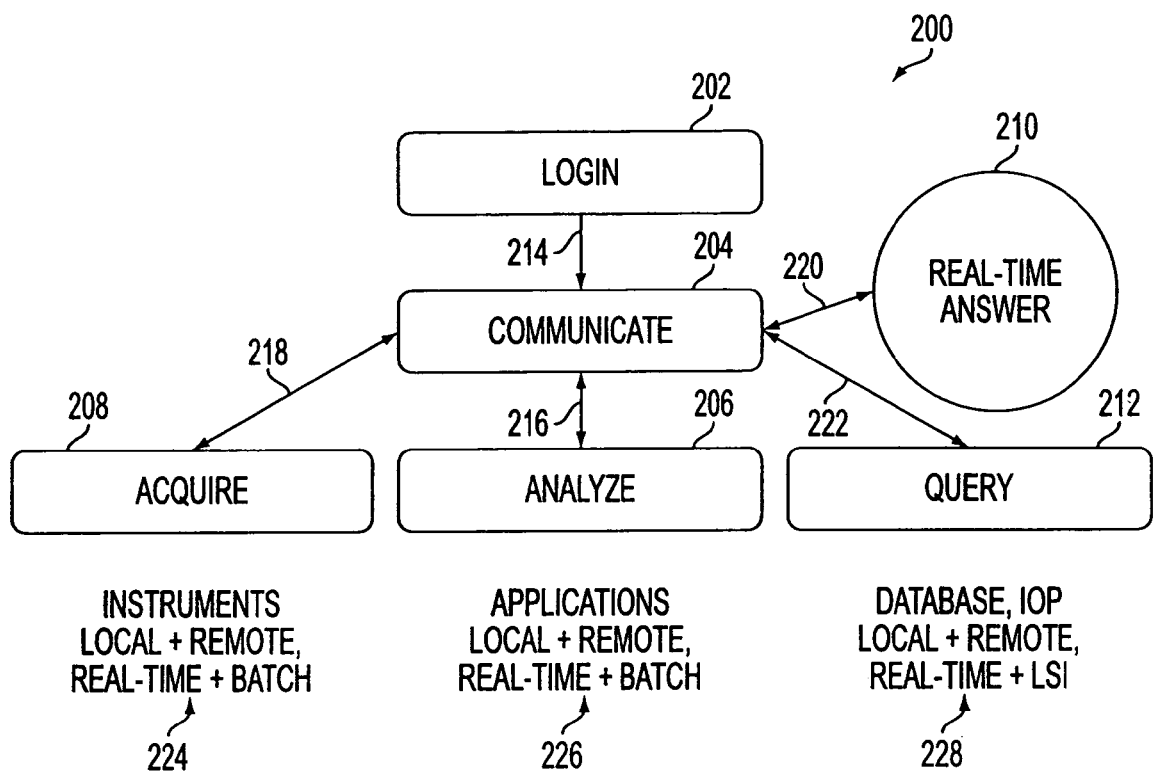
FIG. 2 is a representation of functional relationships between instruments, applications and diverse databases within the IMO architecture.

FIG. 2 is a representation of functional relationships between instruments, applications and diverse databases within the IMO architecture. The depiction below is a representation of functional relationships between instruments, applications and diverse databases within the IMO architecture. Within each session, after Login, all communication between IMO's, instruments, applications and back-end databases and to the IOP is enabled at the IOH level. Real-time and batch data acquisition from instrumentation, real-time and batch analysis via external applications, and queries to the IOP (consisting of iPool subsets, diverse databases, and the like) is performed through the IOH engines and interfaces for both, local and remote access. In addition, the answer-generating processes are also interfacing with the IOH communication handling.

Figure 3:
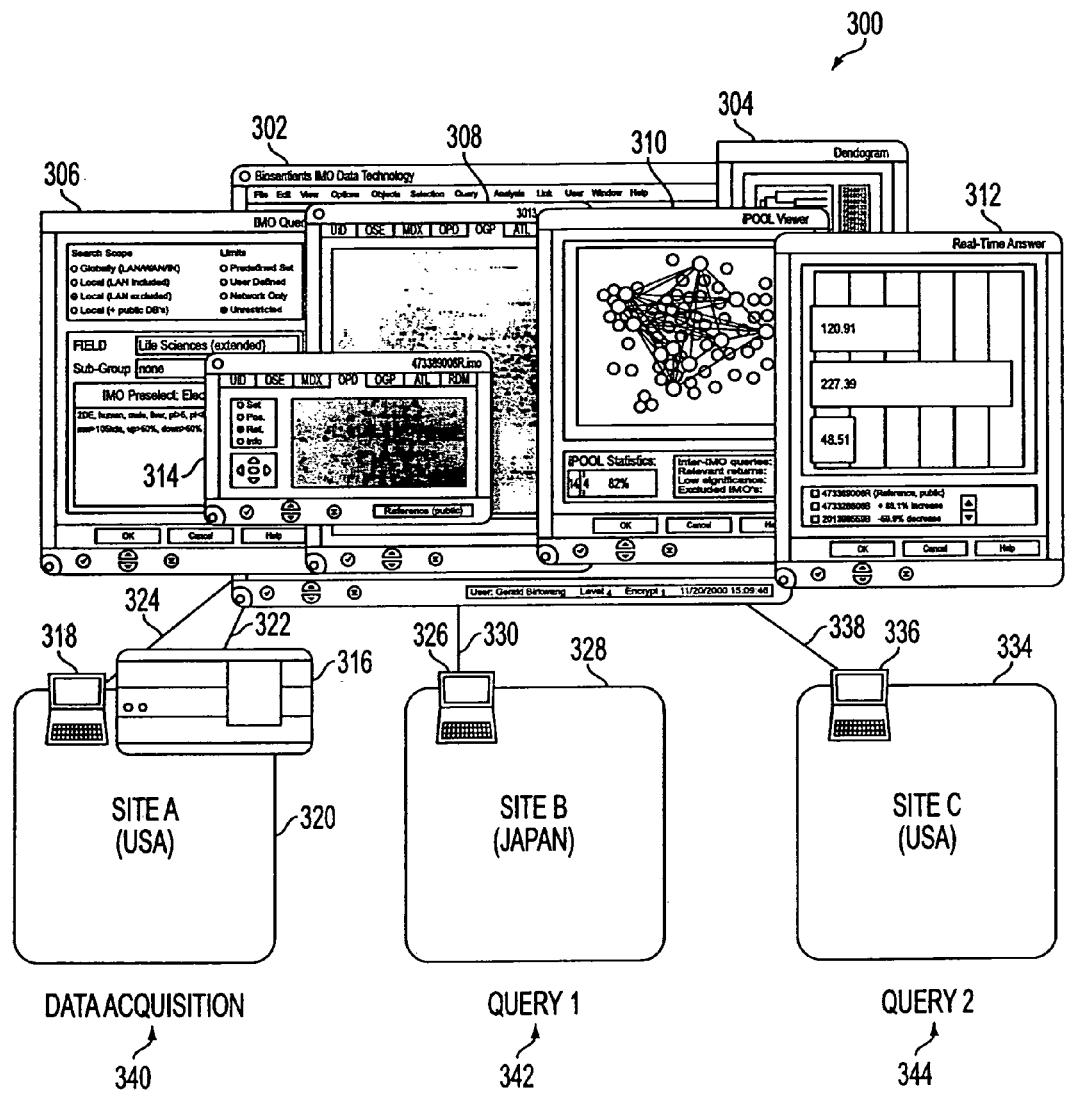
FIG. 3 is a representation of a multi-user network collaborative research.

FIG. 3 is a representation of a multi-user network collaborative research as described herein. The depiction below is a representation of a multi-user network collaborative research as described under "Experimental". Three geographical locations are in real-time interaction through a unified presentation GUI displayed locally, connected globally. Data acquisition, query and aggregated results ("answer") are presented within the main UPL window of the IOH.

Figure 4:
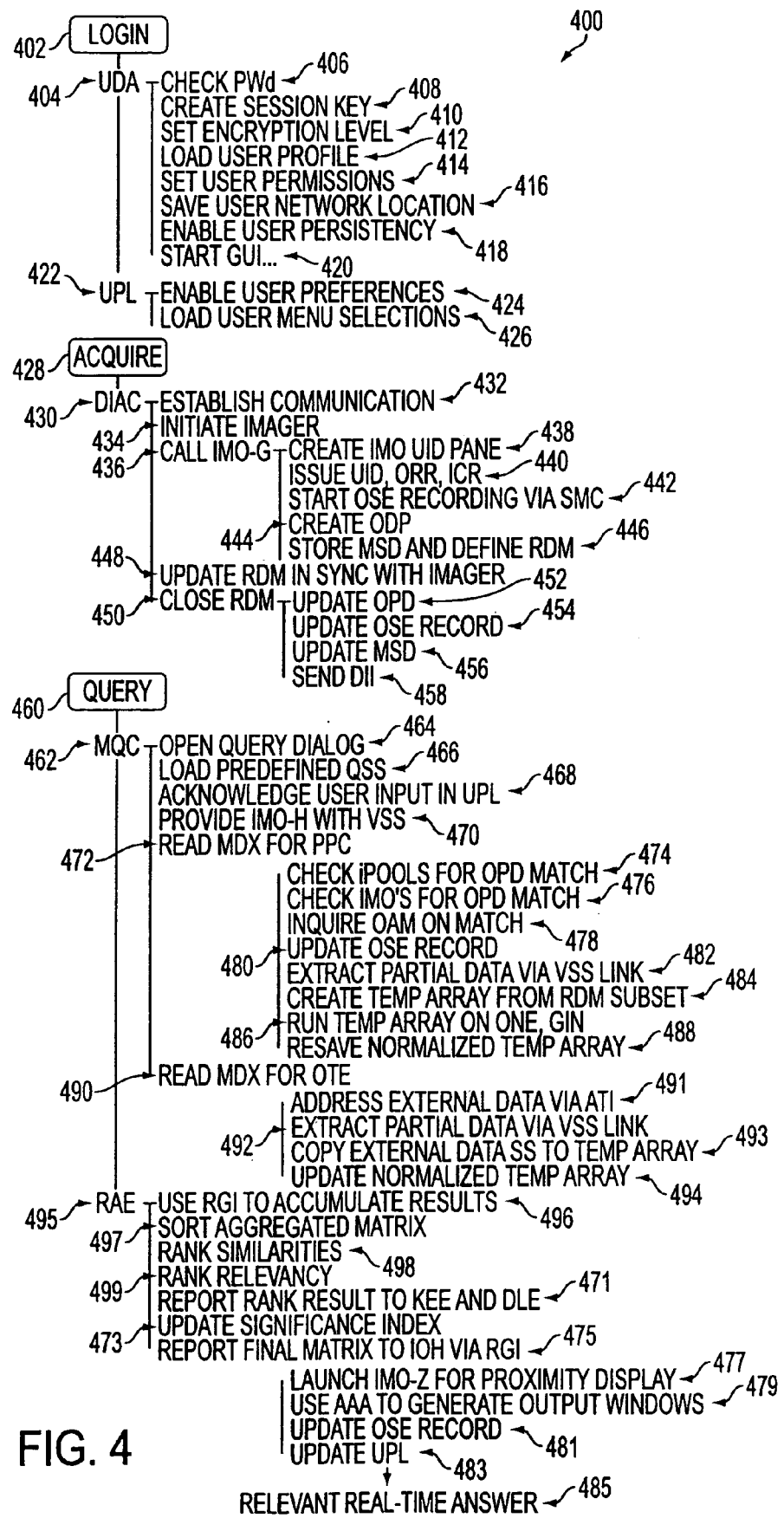
FIG. 4 is a representation of a flow chart of typical data processing within the IMO IT architecture.

FIG. 4 is a representation of a flow chart of typical data processing within the IMO IT architecture. The depiction below is a representation of flow chart of typical data processing within the IMO IT architecture.

In light of the description provided here and in the following more detailed description as well as the appurtenant figures, it will be appreciated that the invention provides an architecture, business model and method of doing business related to searching for and analyzing data generally and in particular relative to biological, chemical, and life sciences type information. Several exemplary embodiments are now described by way of example, but not limitation.

In one aspect, the invention provides a software architecture for an information technology platform, comprising of always-on and event-driven, engines, interfaces and processes and using intelligent molecular software data objects for interactive data records.

In another embodiment, this architecture is further defined such that the architecture further comprises one or more of: a. an Intelligent Molecular Object (IMO), a versatile, data-enabling software object, which provides for real-time translation, integration, and object-to-object/object-to-analysis tools communication at the object data level, to allow multi-dimensional, platform-independent complex queries in real-time; b. an Intelligent Object Handler (IOH), which provides the application framework and user interface for IMO data, to allow for seamless integration of their benefits into legacy systems; and c. an Intelligent Object Pool (IOP), comprising one global virtual data pool comprised of IMO data, which integrates diverse data resources on any system or network to provide result aggregation and instant answers across diversified data subsets.

In another aspect, the IMP of the architectural method and platform is further defined to include one or more of: a. a unique identifier (UID), comprising a property pane layer created at IMO generation, which provides typically a 10 byte, alphanumeric unique identification on any system or network; b. an object access manager (OAM), a property pane layer which governs data security and access according to UID permissions; c. an object root router (ORR), a property pane layer which contains information to define the origin of the object within the system or network; d. an interactive content router (ICR), a property pane layer which routes content and results interactively across the system or network; e. a status management component (SMC), comprised of an object state engine and certain interfaces, which monitors data integrity and command history in GLP/GMP-compliance via state history and governs table lookup actions via the ICR; f. a property pane controller (PPC), which controls the initiation of IMO communication according to activation by 3a through 3d, above; g. vector subsets (VSS) for automatic, dynamic, or user-defined workspace definitions, which provide vectorized, direct addressing of data subsets for the ICR to minimize network traffic; h. meta-data indices (MDX), to provide efficient access via dynamically updated meta-data description relevant to extant data queries and definitions; i. object pane descriptors (OPD), which provide information about each object property pane and their function as required for direct communication with diversified applications and databases; j. an interface for direct information interchange (DII), which provides the interface to communication at the object level; k. an application translator link (ATL), which activates the OAM and ICR to determine the property panes for functional presentation and access within a given application or database environment; l. an object graph preview (OGP) pane, comprising a limited resolution image and graphics viewer for quick graphical data review, particularly of image data and spectral datasets; m. a raw data matrix (RDM), comprising a property pane which provides the full information subset for any data format or structure; and, n. matrix structure definitions (MSD), which allows for data field mapping and enables vector access to specific data fields.

In another aspect, the architecture is further defined such that the architecture and accompanying process and method include the IOH where the IOH further includes: a. a unified presentation layer (UPL), which provides a web-enabled graphical user interface (GUI) to integrate components and/or modules from diverse applications, laboratory systems environments and to act as handler for IMO data; b. a user definition administration shell (UDA), which sets ups and governs access privileges to individual IMO data at the user-defined level and is accessible within heterogeneous network environments; c. at least one engine for data object normalization and standardization, image normalization and standardization, IMO data translation, distributed learning, and knowledge extraction; d. at least one access interface to and in-between instruments, data and applications, comprising interfaces which include, but are not limited to, direct instrument acquisition and control, application translation, direct object query, result generation, and legacy synchronization; e. a master query component (MQC), create complex, multi-dimensional queries, containing pre-defined, configurable subsets of forms commonly used, but not restricted to, in diverse areas of Life Sciences; f. an IMO generator (IMO-G), an event-driven component to acquire data from heterogeneous data resources, including from ongoing data acquisition, in real-time and transforms device outputs and heterogeneous data types to IMO data; g. an IMO handler (IMO-H), which enables user management of IMO data utilizing integrated meta-data tags and pointers; h. an IMO application framework (IMO-A), which provides integration and access protocols to heterogeneous applications and databases on the object level; i. an application definition generator (ADG), which automates the query and generation of application and defines computing environments for the IMO data translation; j. at least one data type translator (DTT), which define the data type dependencies for the IMO-G according to the applications and database environments defined by the ADG; and k. an automated application assembly component (AAA), which provides for just-in-time (JIT) module linking.

In yet another embodiment or aspect, the architecture is further defined such that the IOP includes one or more of: a. sets of Intra-Pools (iPools), regulated by boundary protocols, which provide data subset management and the define integrity and persistence of IMO relationships; b. iPool security authentication protocols (iPSA), which authenticates iPool data requests according to user login and object data identification; c. iPool availability monitoring protocols (iPAM), which define the iPool availability and access requirements of diverse data subsets; d. iPool exchange protocols (iPEP), which determine and govern iPool data exchange protocols according to user-defined criteria; e. an object integrity assessment component (OIA), which assess object integrity for security and QA/QC; f. sets of engines and interfaces to access and generate ranked results within the IOP, including but not limited to an integrity assessment interface, a real-time meta-data linking interface and an iPool-to-iPool query interface; g. an iPool meta-data index (iMDX), which provides dynamic, automated, and user-defined meta-data indices at the iPool level; h. an aggregate meta-data index (aMDX), which provides dynamic, automated, and user-defined meta-data indices at the aggregate IMO level, inclusive of all relevant data resources; i. an object-to-object query meta-data sorter (OQM), to generate temporary tables based on dynamic, automated, and user-defined meta-data indices; and j. an aggregate real-time significance generator (aRSG), which provides for significance detection of values based on query parameters, meta-data indices when relevant, and IMO data ranking.

In one additional particular embodiment, the engines within the architectural platform and method are further defined to include: a. an object state engine (OSE), which provides a continuously-running (always on) set of processes, which monitor and govern activities of IMO data, performing real-time recording, updating and logging functions in GLP/GMP-compliant format.

In another alternative embodiment, one or more engines within the architecture are further defined to include one or more of: a. a set of IMO standardization techniques (IMO-S), comprising engines which provide algorithms for tracking, standardization and/or normalization of object data; b. an generic object normalization engine (ONE), which extracts variable and non-variable variable regions within any set of object data and generates a global standard to which all data can be referred; c. an engine for global image normalization (GIN), which extracts variable and non-variable regions within any set of image data and generates a global standard to which all data can be referred; d. an object translation engine (OTE), which is comprised of methods and functions for real-time meta-data extraction and table generation of raw data matrix, data object, data field, data structure, data functional information, data type, database type, and application type definitions for the OPD; e. a distributed learning engine (DLE), which provides algorithms for dynamic, automated, and user-defined hypothesis generation utilizing global data resources; and, f. a knowledge extraction engine (KEE), which provides algorithms for dynamic, automated, and user-defined significance discovery and report generation.

In a further embodiment of the architecture, the engines may include: a. a result aggregation engine (RAE), to validate, assemble, rank and tabulate results passed from the IOH and to generate output reports across diversified data subsets.

In yet a further embodiment of the architecture, the interfaces may include: a. a direct information interchange interface (DII), which allows for rapid analysis and results aggregation by providing the interface for object-to-object and object-to-analysis tools via such related interfaces and engines including, but not limited to the OQI, OTE, and the DLE.

In yet a further embodiment of the architecture, the interfaces may include one or more of: a. a graphical user interface (GUI), utilizing web-enabling standards including but not limited to Java and XML; b. a direct instrument acquisition and control interface (DIAC), which provides bi-directional real-time communication between the IOH, the IMO and diverse instrumentation; c. an application translation interface (ATI), to provide automated real-time detection of diverse data and applications and gate bi-directional access to the OTE, thus enabling functional, standardized integration of IMO data within heterogeneous data and applications environments; d. an object query interface (OQI), comprising an interface for direct information interchange (DII) with IMO data, which initiates query analysis and results aggregation; e. a result generation interface (RGI) to provide validated, assembled, ranked and tabulated results to the RAE, thus enabling the generation of output reports across diversified data subsets; and f. a legacy synchronization interface (LSI), to provide persistence and synchronization of offline legacy data.

In still another embodiment of the architecture, the interfaces are further defined to include one or more of: a. an iPool integrity assessment interface (iPIA), to asses data integrity within a defined iPool for security and QA/QC; b. a real-time meta-data link interface (RML), which provides for rapid relevant data access based on query parameters and MDX information; c. a pool-to-pool query interface (PPQ), which provides for query optimization based on query parameters and relevant iPool data and meta-data intercommunication; and, d. an IMO Zoomer (IMO-Z), which defines proximity and functional ranking of individual IMO data within the IOP and enables multidimensional IMO data viewing to represent object relationships within the pool and in relationship to other iPools.

In another embodiment, the invention provides a software or combination software and hardware architectural platform that uses objects for real-time, efficient, multidimensional, interdependent intelligent queries.

In yet another embodiment, this software architectural platform and the associated methods and procedures are implemented on general purpose computers, information appliances, and the like information and/or computation devices, at least some of which are coupled to similar devices and servers on an interconnected network, such as the Internet.

When implemented as software, the software may be resident within a memory of the computer or information device and execute within a processor, microprocessor, or CPU of such device. Any conventional computer or information appliance having suitable memory, processor, and interface capabilities may be used, many of which types are known in the art.

An alphabetic list of IMO Information Technology Platform acronyms as used in this description is listed below:

| | |
|---|---|
| AAA | Automated Application Assembly |
| ADG | Application Definition Generator |
| aMDX | Aggregate Meta-data Index |
| aRSG | Aggregate Real-time Significance Generator |
| ATI | Application Translation Interface |
| ATL | Application Translator Link |
| DIAC | Direct Instrument Acquisition & Control Interface |
| DII | Direct Information Interchange |
| DLE | Distributed Learning Engine |
| DTT | Data Type Translators |
| GIN | Global Image Normalization |
| GUI | Graphical User Interface |
| ICR | Interactive Content Router |
| iMDX | iPool Metadata Index |
| IMO | Intelligent Molecular Object |
| IMO-A | IMO Application Framework |
| IMO-G | IMO Generator |
| IMO-H | IMO Handler |
| IMO-S | IMO Standardization Technique |
| IMO-Z | IMO Zoomer |
| IOH | Intelligent Object Handler |
| IOP | Intelligent Object Pool |
| iPAM | iPool Availability Monitoring |
| iPEP | iPool Exchange Protocols |
| iPIA | iPool Integrity Assessment |
| iPool | Intra-Pool (data subsets) |
| iPSA | iPool Security Authentication |
| KEE | Knowledge Extraction Engine |
| LSI | Legacy Synchronization Interface |
| MDX | Meta-data Indices |
| MQC | Master Query Component |
| MSD | Matrix Structure Definition |

-continued

| | |
|---|---|
| OAM | Object Access Manager |
| OGP | Object Graph Preview |
| OIA | Object Integrity Assessment |
| ONE | Object Normalization Engine |
| OPD | Object Pane Descriptors |
| OQI | Object Query Interface |
| OQM | Object-to-Object Query Meta-data |
| ORR | Object Root Router |
| OSE | Object State Engine |
| OTE | Object Translation Engine |
| PPC | Property Pane Controller |
| PPQ | Pool-to-Pool Query |
| RAE | Result Aggregation Engine |
| RDM | Raw Data Matrix |
| RGI | Result Generation Interface |
| RML | Real-Time Metadata Link |
| SMC | Status Management Component |
| UDA | User Definition and Administration Shell |
| UID | Unique Identifier |
| UPL | Unified Presentation Layer |
| VSS | Vector Subsets |

II. Intelligent Molecular Object Data for Heterogeneous Data Environments with High Data Density and Dynamic Applications Needs In intelligent molecular object (IMO) data for heterogeneous data environments aspect, structure and method are provided for object data creation and identification, root data and meta-data content routing, data status management, meta-data indexing, and object query and response management for diversified data in networked Life Sciences applications environments.

In the data creation and identification method, the user query, command, or data acquisition action invokes the unique object identifier (UID) pane, which identifies each data object and implements unique identity, security and access definitions. The object root router (ORR) defines the origin of the object within the network and directs storage of the object within the database. In the meta-data content routing methods, the user query, command, or data acquisition action invokes the interactive content router (ICR) pane, which defines where query-relevant content and/or results will be directed within the network for analysis or presentation. In the data status management method, the status management component (SMC) monitors data integrity and records the command history according to GxP-compliant LIMS requirements. Simultaneously in the meta-data indexing method, the meta-data index (MDX) pane creates an index of data information and makes the meta-data available to the object pane descriptor (OPD). In the object query and response method, the object pane descriptor (OPD) determines the relevant panes for access and presentation. Simultaneously, the application/database definition router (ADDR) determines and relays the application/database requirements to the application translator link (ATL). The application translator link (ATL) activates the object access manager (OAM), which determines the meta-data panes for functional presentation and access within a given application or database environment. Simultaneously, the object query interface (OQI) initiates object meta-data analysis and query results aggregation via the object-to-object direct information interchange (DII) and relays significant query outcomes to the object pane descriptor (OPD) for presentation to the user. An object graph preview (OGP) pane option is included within the object including a limited resolution image/graphics viewer for quick graphical data review of data objects containing graphical information. Other extensible options include ownership management; use tracking; selective access; object handling and storage technology.

Methods are provided to define and describe the architecture for interactive, intelligent molecular object (IMO) data structures.

Objects are defined in a hierarchical, multi-layered ("pane")-style, which accounts for secure, property-driven functional bi-directional access to the data contained in these panes. Each object is defined by a minimal set of panes as described in detail below, but may or may not have additional panes attached with unique, functionality-driven properties. The minimal set of panes contains the following elements:

an unique identifier (UID) pane, which allows for secure identification of the IMO on the network; it consists of several elements which allow for routing to its origin (object root router, ORR) and distributed routing of its content or selected, object-specific query-driven results (intelligent content router, ICR) within defined object-to-object communication parameters. The UID pane also contains object creator information, access privilege information and common security elements to protect the IMO from unauthorized access. In addition, the current user information and its relationship to the object reside temporarily in this pane and are updated dynamically;

a status management component (SMC) pane, which monitors data integrity and command history in G*P-compliant LIMS-style. This object state engine (OSE) contains coded data access information such as data acquisition completed, calibration information, applied data transformation or analysis processes, validation management and the like. Information contained herein is used for data integrity protection, rollback and process history;

a metadata index (MDX), which allows for fast access to the IMO based on object functionality and description (an indexed and ranked "data-about-data" dictionary for type and topic predefined searching of query-relevant intelligent molecular objects (IMO's));

an object pane descriptor (OPD), which allows for explicit definition of pane structure, order and function. This pane also includes an application/database definition router (ADDR) to call proper analysis tools based on the object panes available;

an application translator link (ATL) pane which provides algorithm to allow for inter-application communication and contains an object access manager (OAM) for application integration. This pane allows for quick and seamless application integration and provides the functionality for rapid and dynamic development of new applications;

an object query interface (OQI) for object-to-object direct information interchange (DII), which processes the query internally within the IMO; and;

a raw data matrix (RDM) pane containing the full information subset in any data format or structure; and; a matrix structure descriptor (MSD) which allows for data field mapping and vector access to individual data fields.

Optional panes may include an object graph preview (OGP) pane comprising of a limited resolution image/graphics viewer for quick graphical data review, particularly of image data or spectral datasets and the like.

It is evident from the above description, that this object architecture allows for real-time answers to complex, multi-dimensional, interdependent queries by providing the infrastructure for a global, comprehensive analysis of otherwise not accessible vast, inconsistent data sets.

The following examples are offered by way of illustration and not by way of limitation. Data from 2 Dimensional Gel Electrophoresis (2 DE) typically exhibit an intrinsic complexity due to the reproducibility challenges inherent in this multi-step experimental technique. Each of such gel comprises over 5000 individual peptide spots that relate in its entity to a defined stage in the cell metabolism. Such image data were used in a global query to obtain characteristics of significant protein expression in human liver cells at different disease states. Only larger peptides with isoelectric points (pI's) between 5.0-7.0 and within a size range of greater than 96000 Dalton (DA) were of therapeutic interest and only validated experiments were included.

Figure 5:
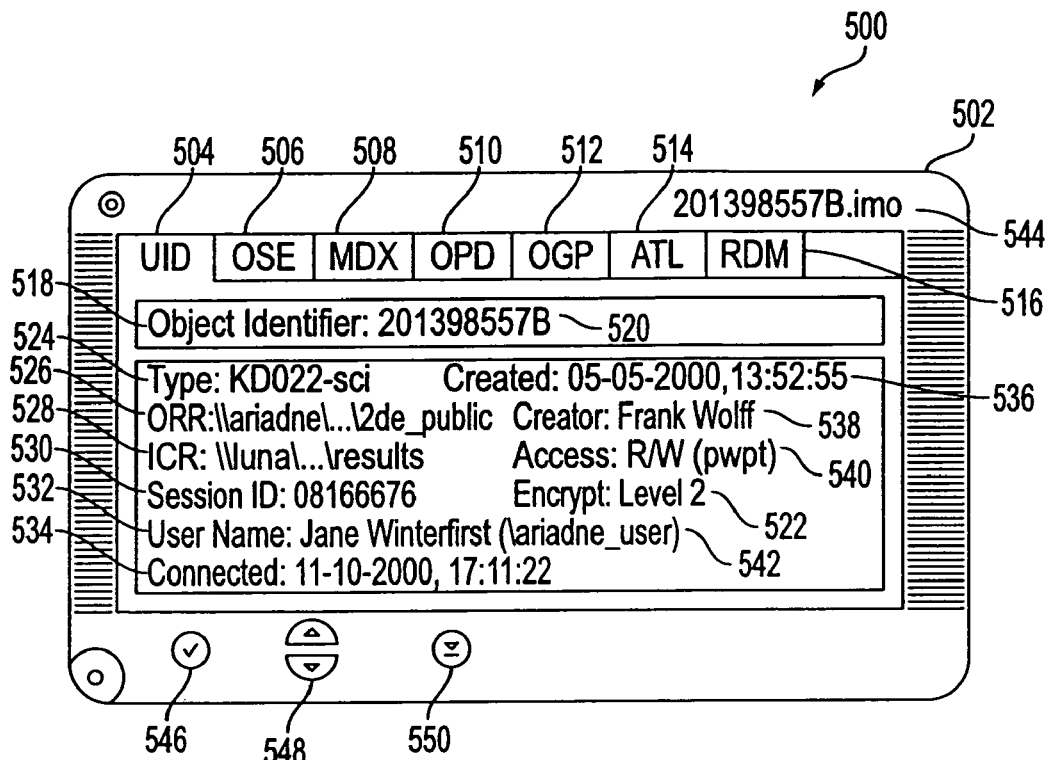
FIG. 5 is a representation of the user interface of an intelligent molecular object (IMO) showing its unique identifier pane (UID).

FIG. 5 is a representation of the user interface of an intelligent molecular object (IMO) showing its unique identifier pane (UID). The depiction is a representation of the user interface of an intelligent molecular object (IMO) showing its unique identifier pane (UID). It contains object creation data; the location of the object on the network; information routing information; user data, session and connection verification and security settings such as encryption level or password protected access.

Figure 6:
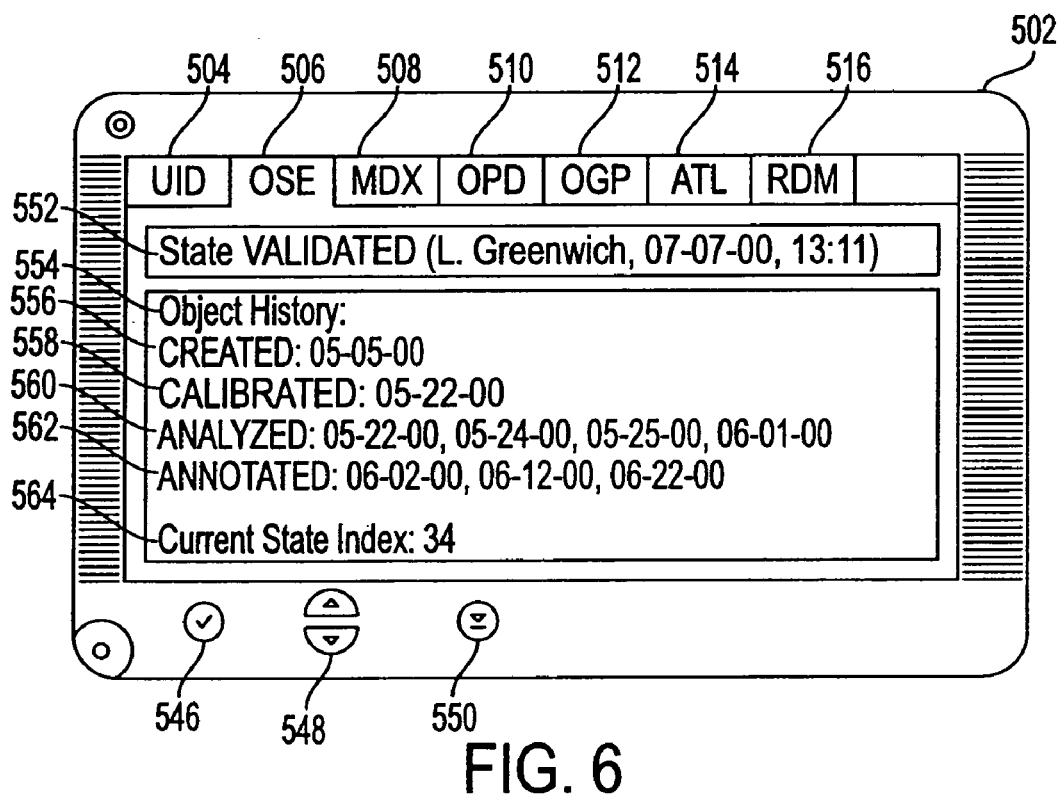
FIG. 6 is a representation of the user interface of an intelligent molecular object (IMO) showing its status management component (object state engine, OSE).

FIG. 6 is a representation of the user interface of an intelligent molecular object (IMO) showing its status management component (object state engine, OSE). The depiction is a representation of the user interface of an intelligent molecular object (IMO) showing its status management component (object state engine, OSE). In the displayed example of 2 DE data, the experimental state is validated. Means for a quick review of the object history are provided including significant events since its creation such as calibration, analysis and annotation.

Figure 7:
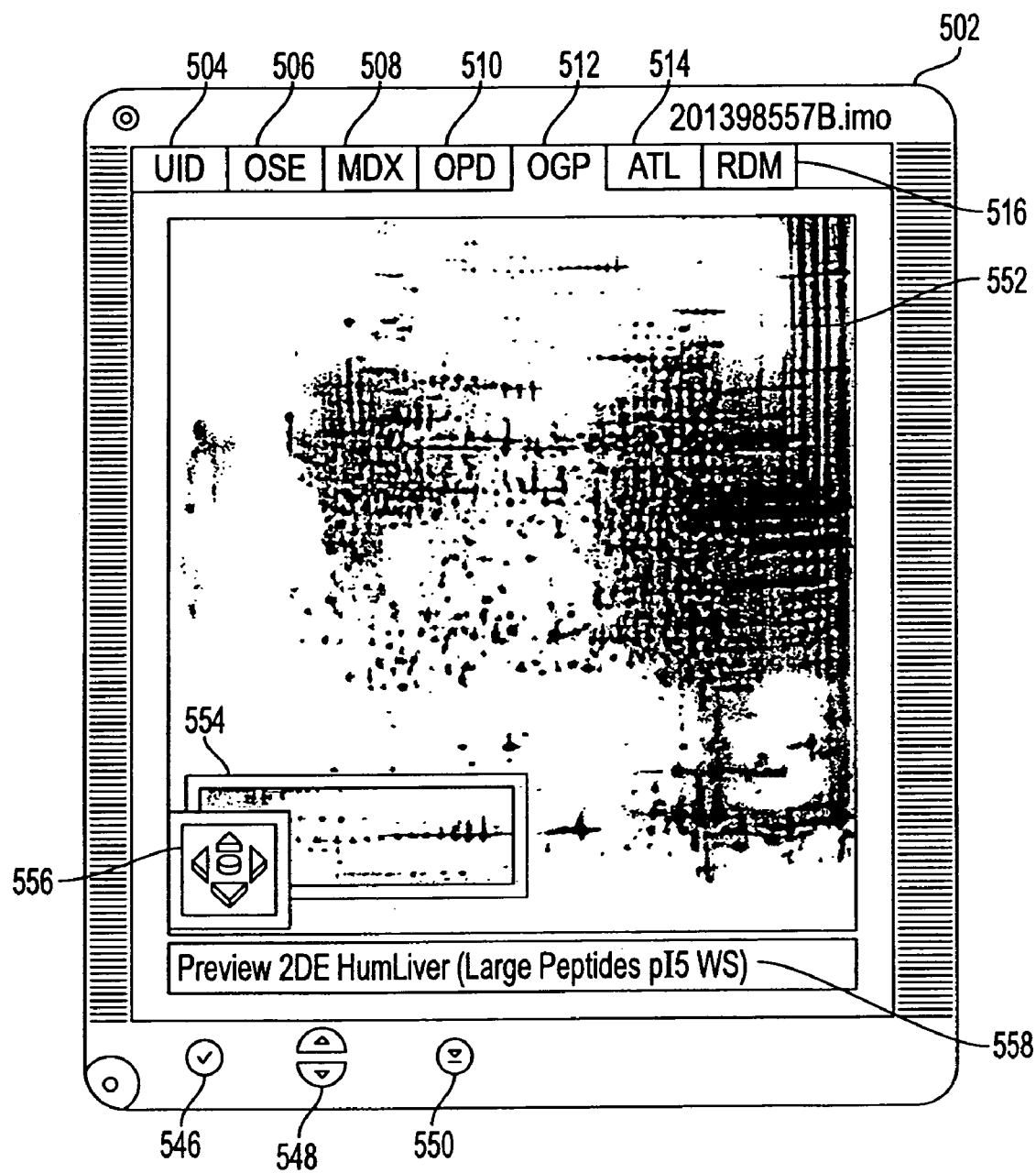
FIG. 7 is a representation of the user interface of an intelligent molecular object (IMO) showing the optional object graph preview (OGP) pane comprising a limited resolution image/graphics viewer.

FIG. 7 is a representation of the user interface of an intelligent molecular object (IMO) showing the optional object graph preview (OGP) pane comprising a limited resolution image/graphics viewer. Object graph preview (OGP) pane example on 2 Dimensional Gel Electrophoresis protein expression data. The low-resolution image viewer depicts an overview of the entire gel in a large-style thumbnail view with an inset of the immediate workspace area used in the query.

In light of the description provided relative to the overall architectural platform and the following more detailed description and figures, several exemplary embodiments are now described for this aspect of the invention by way of example, but not limitation.

In one aspect, the invention provides an architectural platform and framework as well as method for using interactive Objects for real-time, efficient, multidimensional, interdependent intelligent queries.

In another aspect, it provides an Intelligent Object consisting of a set of functional layers also referred to for convenience as "Panes". It further provides methods and procedures for creating the Intelligent Objects as well as the structures for intelligent objects, whether molecular or other object types dealing with different data types or subject matter. The invention also provides a Unique Object Identifier (UID) Pane within the object, which identifies each object and contains rules for object data security and access permissions. In another aspect, it provides an Object Root Router (ORR) Pane within the object, which defines the origin of the object within the network. In another aspect, it provides an Interactive Content Router (ICR) Pane within the object, which defines where content and/or results will be directed within the network.

In another aspect or embodiment, the invention provides a Status Management Component (SMC) Pane within the object, which monitors data integrity and command history in G*P-compliant LIMS-style. In yet another embodiment, the invention provides a Meta-Data Index (MDX) Pane within the object. In yet another embodiment, it provides an Object Pane Descriptor (OPD) within the object, which includes an Application/Database Definition Router (ADDR).

In even another embodiment, the invention provides an Application Translator Link (ATL) Pane within the object, which includes an Object Access Manager (OAM) for application integration. It may further provide an Object Query Interface (OQI) for Object-to-Object Direct Information Interchange (DII), as well as an Object Graph Preview (OGP) Pane within the object including a limited resolution image/graphics viewer for quick graphical data review, and/or a Raw Data Matrix (RDM) Pane within the object including a Matrix Structure Descriptor (MSD).

These aspects and embodiments are merely exemplary and the structures, methods, procedures and elements may be combined in numerous additional ways to provide further and different embodiments.

III. Object State Engine for Intelligent Molecular Object Data Technology

With respect to the Object State Engine (OSE) aspect, structure, methods and functions comprising a set of processes are provided for: request for creation of intelligent molecular objects; assignation of unique object identification; object activity monitoring and history recordation; GLP/GMP compliance state table lookup and state validation assignment; security and privilege access management; status memory and back-end interaction for stateless networks; validation status ranking; vector subset definition for dynamic information exchange; object-to-object and external query processing.

In the object creation and unique identification assignment processes, first a flag is set, that the object does not exist. Then, this flag triggers an object creation module to generate an intelligent molecular object (IMO), comprising of a set of interactive data object property panes. An object root router (ORR) pane is assigned which defines the origin of the object within the network. Simultaneously, a unique object identifier (UID) pane is assigned, which identifies each data object and implements identity, security and access definitions. Next, the core processing and timing functionality for activity listening mode (ALM) is generated, and the initial object state history is created. This module reports its completion state back to the state engine.

In the object activity, history and validation processes, the ALM provides continuous object activity monitoring and state history recordation, which provides an activity record comprising of action (utilizing a table), user information and time/date stamp ("what/who/when") information. Any such entry is called object activity record (OAR), which, in sequential order, comprise the object state history. Next, all actions are validated by the assignment of a coded state according to an ISO 9000/ANSI-compliant table for Good Laboratory Practices/Good Manufacturing Practices (GLP/GMP) regulatory compliance.

In the access management, status memory and back-end processes, access to object property panes is granted to all object- and object-to-object activities based on security protocols and privilege definitions. Upon any access request, a status flag is set at the core of the object state engine, which triggers data security processing on the individual object level. Simultaneously, a status definition buffer is maintained for state-less networks and action consequences are transmitted to back-end systems upon completion of state updates.

In the validation status ranking, objects and/or object properties are ranked based on validation state information. This rank is used to provide validity and query-relevance for fast information interchange.

In the vector subset definition for dynamic information interchange processes, a state-related event-driven process component defines vectors to point to limited workspace subsets of object data within the data matrix, which enables real-time, dynamic and standardized direct information interchange.

In the query state processing, an event-driven process component handles external query submissions to the object. Queries, commands and data acquisition actions invoke an interactive content router (ICR) pane within the object, which defines where query-relevant content and/or results will be directed within the network for analysis or presentation. Simultaneously, a process component sets the timing for object-to-object query result synchronization and initiates result aggregation by triggering an output request to the unified presentation interface via ICR.

The described object state engine defines order and timing for processing of, and interaction with, object activities, thereby retaining object integrity and dynamic state monitoring in data exchange over otherwise stateless global networks.

Methods and functions are provided for a set of processes, which comprise an intelligent object state engine. Purpose of the engine is to monitor and govern activities of intelligent molecular objects and in-between such objects in real-time.

The first component comprised in the state engine processes a request to create an object and assign a unique identifier to it. Additionally, this process generates its first object state history record and activates state monitoring ("activity listen mode", ALM). This component provides the core processing and timing functionality for the state engine.

Next, there is a process component of the object state engine, which monitors any object activities or transactions with the object and adds an activity record to the object state history, consisting of "what/who/when?"-information. This component also may transmit security alerts back to the network and/or update transaction logs.

Further, the state engine contains a process component, which relates all activities to Good Laboratory Practices/Good Manufacturing Practices (GLP/GMP)-compliant, laboratory information management system (LIMS)-style experiment data states. This process also validates the current action by assigning a defined state to the object, utilizing a lookup table.

Next, the state engine contains a process component, which allows or denies access to the object and permits object-to-object activities based on security protocols and privilege definitions. This process sets a status flag and reports directly to the core of the state engine, which monitors activity, thus governing data security on the individual object level.

Also contained in the state engine is a process, which utilizes a small buffer as status memory for state-less networks, which allows to transmits action consequences back to the backend system upon state update completion.

Next, the state engine contains an event-driven process component, which uses a validation state based information exchange to rank objects or object properties for relevancy and faster access.

Next, the state engine contains a state-related vector definition of object data subsets for dynamic information interchange to define a limited workspace area within each data set for direct, real time access.

Lastly, the state engine contains a query processing component, which handles external query submissions to the object. This component also times object-to-object query result synchronization and initiates result aggregation by triggering an output request to the unified presentation interface.

It is evident from the above description, that this object state engine allows to track object states in real-time in otherwise state-less network environments by providing the infrastructure for a global, comprehensive and secure monitoring and updating.

In light of the description provided relative to the overall architectural platform and this additional detailed description, several exemplary embodiments are now described for this aspect of the invention by way of example, but not limitation.

In one aspect, the invention provides a continuously-running set of processes, comprising an object state engine monitoring and governing any activities of intelligent molecular objects in real-time. It also provides a process component of the object state engine to trigger a module for creating an object if such object does not exist, and assigning a unique identifier to it; as well as a set of process components within the object state engine, which monitor object activities or transactions with the object and record its activity history. Aspects and embodiments of the invention further provide a process component of the object state engine, which relates activities to Good Laboratory Practices/Good Manufacturing Practices (GLP/GMP)-compliant, laboratory information management system (LIMS)-style experiment data states and validates the current action by assigning a defined state to the object; a process component of the object state engine, which governs access to the object and object-to-object activities based on security protocols and privilege definitions; a process component of the object state engine, which maintains status remembering in state-less networks and transmits action consequences back to the backend system; and a process component of the object state engine, which ranks requests for information exchange based on annotation or validation state of the addressed data object. The invention further provides: a process component of the object state engine, which defines vectors to subsets of object data ("the workspace") within the data matrix for dynamic information interchange; a processing component of the object state engine for handling external query submissions to the object; and a process component of the object state engine, which handles object-to-object query result synchronization. Each of the structures and processes described may be used separately or in combination.

The following examples are offered by way of illustration and not by way of limitation. In a typical laboratory collaboration example, a scientist acquires data from instrumentation and performs analysis on these data. For calibration of the raw data, different protocols based on the assay or method used are applied for such parameters like imaging data (e.g. fluorescence intensity, optical density), molecular properties (e.g. size, isoelectric point, net charge, melting point, 3 D structure, subunit composition, amino acid composition, nucleotide composition), biological properties (e.g. enzyme activity, antibody activity), spectral properties (e.g. IR spectrum, UV spectrum, visible spectrum, Raman spectrum, ESR spectrum, NMR spectrum). Additionally, data sets are annotated according to metabolic functions, location on genes, sequencing information, and that like.

Within a group of researchers, typically each specialist generates sets of data from a specific instrument using a dedicated technique and calibration method. Real-time collaboration however, requires access to the entire information of a single experiment, even if subsets of data were generated at a different location and by a different research team. Secure access to such data is mandatory to provide for confidentiality and selective use of information from such data.

In the access to data objects, timing is crucial, particularly in real-time environments. To maintain object data consistency in multi-user and stateless multi-network operations, a set of processes to govern activities on object level and prioritize actions based on time availability is mandatory. The described OSE performs this task.

Figure 8:
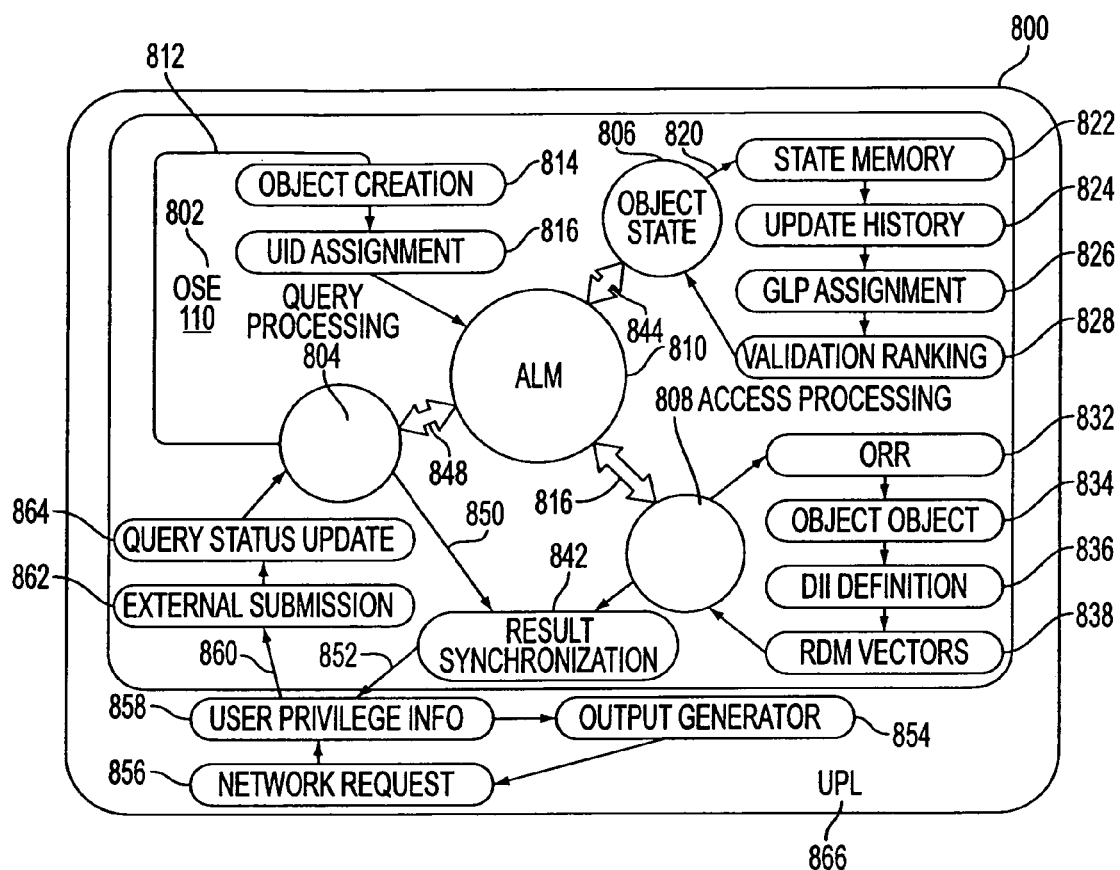
FIG. 8 is a representation of a flow chart depicting processes of the object state engine.

FIG. 8 is a representation of a flow chart depicting processes of the object state engine (OSE). The central element of the OSE (blue pane) is the ALM process (orange), which governs any activity on object level. The two state processing elements (in red) are query state processing and object access processing, which handles routing (ORR), object-to-object interaction states, data information interchange (DII) definitions and workspace RDM vectors. The object state processing (green) includes storage of current state, history update functions, assignment of GLP/GMP-compliance via lookup table and ranking based on validation assessments. The outer pane (in green) represents the universal presentation layer (UPL), which contains non-time critical components for I/O operation and utilizes the state provided from the OSE for tasking. Object creation processes are only triggered by the OSE, but carried out within UPL tasking.

FIG. 9 is an example list of common state designations for life science applications. FIG. 9 depicts a representative portion of an IMO lookup table used in the life sciences. Actions are grouped in accordance to GLP/GMP guidelines for certified and/or regulated laboratories. The list below contains only the most instructive examples and is offered by way of illustration and not by way of limitation.

FIG. 10 is an example of an object state history, comprised of time-sequential set of object activity records (OAR). FIG. 10 depicts an example of the Object State History, comprised of OAR's (Object Activity Record). A typical record is shown from data object creation prior to data acquisition from an analytical instrument, several steps of calibrated analysis carried out by different users within and outside the local network. Note, that same state codes can occur within the object state history for different users, e.g. output requests and the like.

IV. Object Translation Engine for Intelligent Molecular Object Data in Heterogeneous Data Environment with Dynamic Application Needs In the Object Translation Engine (OTE) aspect, structure, methods and functions for real-time standardization, translation and integration of intelligent molecular objects within heterogeneous data environments are provided.

These methods and functions comprise the following sets of event-driven processes: data information extraction and generation for non-object data standardization; data type extraction to determine data access and structure dependencies; provision of data type, access and structure definition tables; database type extraction to determine database access and structure dependencies; provision of database type, access and structure definition tables; application type extraction to determine application type, access and structure; provision of application type, access and structure definition tables; provision of table lookup methods and functions to provide real-time translation of intelligent molecular objects; real-time object property pane presentation to provide real-time integration according to defined data structure, database, and application requirements.

In the event-driven data definition method, data object, data field and raw data matrix definitions are determined by a component within the translation engine, which is activated by an external access and translation interface, which generates a set of processes to determine data object, data field and raw data matrix definitions. These processes, similarly, extract the information required for data object, data field and raw data matrix definition of previously existing or newly acquired data. Further, the processes extract also sets of tables to generate corresponding property panes within the Intelligent Molecular Object.

In the event-driven standardization method, an external access and translation interface component activates a component comprising of a set of non-object data standardization processes. These standardization processes extract the structure and functional information required for standardization and normalization of non-object data, and provide information such as workspace definitions and the like required for standardization to external intelligent molecular object standardization components.

Simultaneously, in the event-driven data type extraction and table definition methods, a component within the translation engine, which provides a set of processes to determine data access and structure dependencies, is activated by an external access and translation interface. These processes extract the information required for data type access and structure definition of previously existing or newly acquired data, and direct the information to the data type definition component within the translation engine. The data type definition component then generates and provides a data type definition table, comprising structure and access definitions, to an external translation interface component for intelligent molecular objects.

Simultaneously, in the event-driven database type extraction and table definition methods, a component within the translation engine, which provides a set of processes for database type extraction, is activated by an external access and translation interface. These processes determine database access and structure dependencies of data within heterogeneous databases, and direct the information to the database type definition component. The database type definition component generates and provides a database type definition table, comprising structure and access definitions, to an external translation interface component for intelligent molecular objects.

In the event-driven application type extraction and table definition methods, a component within the translation engine, which provides a set of processes for application type extraction, is activated by an external access and translation interface. These processes determine database access and structure dependencies of heterogeneous applications, and direct the information to the application type definition component. The application type definition component then generates and provides an application type definition table, comprising structure and access definitions, to an external translation interface component for intelligent molecular objects.

In the event-driven table lookup methods, a component within the translation engine, which provides a set of processes for table lookup to provide real-time translation within heterogeneous database and application environments, is activated by an external access and translation interface.

In the event-driven object pane description methods, a component within the translation engine, which provides a set of processes for object pane descriptors in real-time, according to defined data structure, database, and application requirements within heterogeneous database and application environments, is activated by an external access and translation interface.

Methods and functions are provided, which define and describe the architecture for an object translation engine for intelligent molecular object data. These methods and functions are comprised of sets of event-driven processes, which provide components for automated real-time data standardization, translation and integration of intelligent molecular objects within heterogeneous data environments.

The first component described herein, provides a set of processes to determine data object, data field and raw data matrix definitions. These definitions are required for data object, data field and raw data matrix table definition and generation. This event-driven component is activated by an external access and translation interface and directs extracted table information to a component for intelligent molecular object property pane generation.

Next, a component described herein, provides a set of non-object data standardization processes. These processes extract the structure and functional information required for standardization and normalization of non-object data. This event-driven component is activated by an external access and translation interface and directs extracted information to external standardization components.

Next, a component described herein, provides a set of processes, which carry out data type extraction to determine data access and structure dependencies. These data type definitions are required for access and structure definition table definition and generation. This event-driven component is activated by an external access and translation interface and directs extracted table information to a component for generation of data type definition tables.

Next, a component described herein, provides a set of processes to generate data type, access and structure definition tables. These data type definition tables are required for real time translation and integration of intelligent molecular objects within diverse data environments. This event-driven component is activated by the data type, access and structure extraction component, and directs extracted table information to a component for intelligent molecular object property pane generation.

Next, a component described herein, provides a set of processes, which carry out database type extraction to determine data access and structure dependencies. These database type definitions are required for access and structure definition table definition and generation. This event-driven component is activated by an external access and translation interface and directs extracted table information to a component for generation of database type definition tables.

Next, a component described herein, provides a set of processes to generate database type, access and structure definition tables. These database type definition tables are required for real time translation and integration of intelligent molecular objects within diverse data environments. This event-driven component is activated by the database type, access and structure extraction component, and directs extracted table information to a component for intelligent molecular object property pane generation.

Next, a component described herein, provides a set of processes, which carry out application type extraction to determine data access and structure dependencies. These application type definitions are required for access and structure definition table definition and generation. This event-driven component is activated by an external access and translation interface and directs extracted table information to a component for generation of application type definition tables.

Next, a component described herein, provides a set of processes to generate application type, access and structure definition tables. These database type definition tables are required for real time translation and integration of intelligent molecular objects within diverse data environments. This event-driven component is activated by the application type, access and structure extraction component, and directs extracted table information to a component for intelligent molecular object property pane generation.

Next, a component described herein, provides a set of table lookup processes, to provide real-time translation of the intelligent molecular object within heterogeneous database and application environments. This event-driven component is activated by an external access and translation interface, and directs provided table information to a component for real-time molecular object property pane generation.

Finally, a component described herein, provides a set of processes for object property pane presentation, to enable real-time integration of the intelligent molecular object, within heterogeneous database and application environments. This event-driven component is activated by an external access and translation interface, provides property pane presentation of the intelligent molecular object in real-time, according to defined data structure, database, and application requirements.

Through provision of the methods and functions, the architecture is provided for the real-time translation and integration of intelligent molecular objects within diverse data environments. It is evident from the above description that the methods and functions described allow for efficient real-time standardization, translation and integration of complex, multidimensional, interdependent, heterogeneous data, within heterogeneous database and applications environments.

In light of the description provided relative to the overall architectural platform and this additional detailed description, several exemplary embodiments are now described for this aspect of the invention by way of example, but not limitation.

In one aspect the invention provides an event driven sets of processes, comprising an object translation engine to perform automated real-time data translation for integration of intelligent molecular objects within heterogeneous data environments. It further provides a component within the translation engine to determine data object, data field and raw data matrix definitions for intelligent molecular objects and extracting sets of tables to generate corresponding property panes; as well as a component within the translation engine, which provides data structure and functional information for standardization of non-object data; component within the translation engine to carry out data type extraction to determine data access, structural and functional dependencies for intelligent molecular objects; a component within the translation engine, which provides data type, access, structure and function definition tables for intelligent molecular objects; a component within the translation engine, which carries out database type extraction to determine database access and structure dependencies for intelligent molecular objects; and a component within the translation engine, which provides database type, access and structure definition tables for intelligent molecular objects. In addition, it provides a component within the translation engine, which carries out application type extraction to determine application type, access and structure for intelligent molecular objects; component within the translation engine, which provides application type, access and structure definition tables for intelligent molecular objects; component within the translation engine, which provides table lookup to provide real-time translation of the intelligent molecular object within heterogeneous database and application environments; and, a component within the translation engine, which provides intelligent molecular object pane descriptors in real-time, according to defined data structure, database, and application requirements. These components may be used separately or in any combination even though such combinations are not specifically described here.

The following examples are offered by way of illustration and not by way of limitation.

In a typical example, several scientists perform analysis, utilizing data acquired via laboratory instrumentation, stored in a local database and analyzed by a particular application or set of applications. Typically, each specialist generates sets of data from a specific instrument using a dedicated technique and calibration method and utilizes applications designed to access and interface with the particular data type, access and structure definitions of the sets of data acquired.

Real-time analyses of the entire data resources relevant to diverse queries, however, require unified, real-time access to the global information relevant to diverse applications, even if subsets of data were generated at different locations, by different research teams or using different methods. Further, these data subsets may be stored as different data types, and according to differing access, structure and database definitions.

Real-time analyses based on global data resources must address standardization, translation and integration requirements for diverse applications in real-time, for high numbers of high-density data, according to heterogeneous data and database type, structure, and access protocols. In order for such analyses to occur, efficient workspace-oriented means for standardizing, translating, and integrating such data must be provided. Using the described translation engine within the IMO platform, several scientists at different locations can now efficiently perform simultaneous collaborative analysis on global data resources in real-time.

Figure 11:
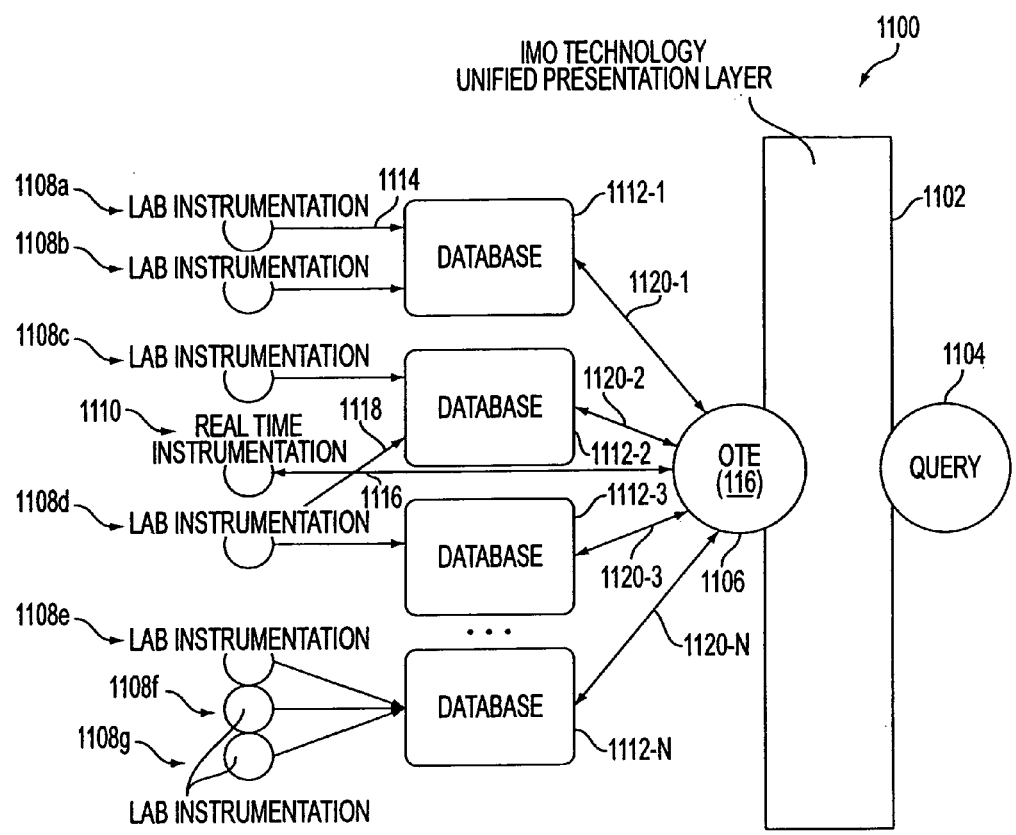
FIG. 11 is a representation of the unified presentation of heterogeneous data within a query.

FIG. 11 is a representation of the unified presentation of heterogeneous data within a query. The depiction below portrays the unified presentation of heterogeneous databases and data sets accessed in a representative experimental query. Different laboratory instruments are connected to different databases. In the query presented to the unified presentation layer, all these databases are in bi-directional communication with the IMO's via the real-time Object Translation Engine (OTE), which, similarly, is interconnected directly to real-time instrumentation; thus a global query is performed on immediacy level.

Figure 12:
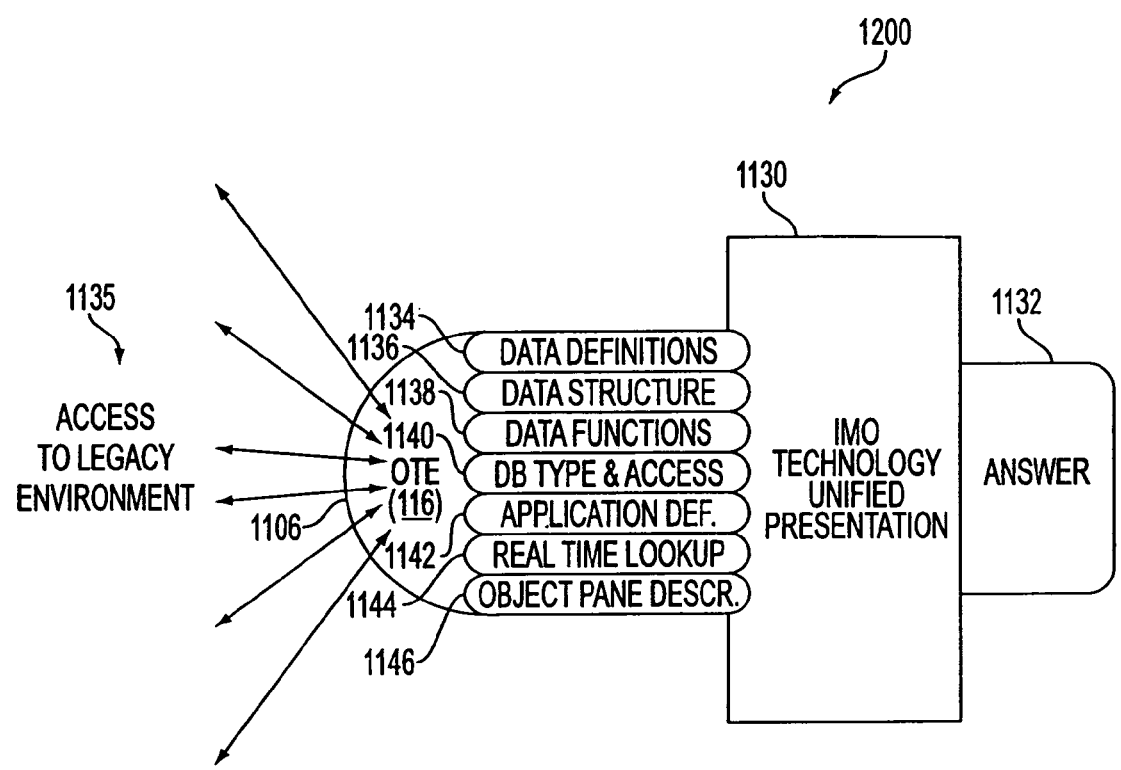
FIG. 12 depicts the unified data presentation processing through the object translation engine for real-time analysis access.

FIG. 12 depicts the unified data presentation processing through the object translation engine for real-time analysis access. The depiction portrays the unified data presentation, processed by the object translation engine and provided for analysis in real-time. Data definitions, structure, functions, database type and access definitions and application definitions are processed via real-time lookup and object pane descriptors.

V. Handling Device for Intelligent Molecular Object Data in Heterogeneous Data Environment with High Data Density and Dynamic Application Needs In the Intelligent Object Handler aspect, structure and methods are provided for: unified presentation and management of user definition, administration and security protocols; definition of user interaction and computing environment protocols; and definition of data type translation protocols.

Additional methods are provided for: real-time generation of Intelligent Molecular Object (IMO) data; data object standardization; and definition of object representation for unified data management and analysis in heterogeneous data environments with high data density and dynamic application needs.

In the presentation method, the unified presentation layer (UPL) provides the web-enabled graphical user interface that integrates the technology defined to unify diverse applications, laboratory systems environments, and intelligent molecular object (IMO) data at the graphic user interface layer. In the security and access method, the user definition and administration (UDA) shell prompts for user input regarding access privileges environments at login. The master query component (MQC) then presents security and access protocols to the presentation layer and fields user queries and commands for data acquisition, retrieval, or analysis.

In the environment definition method, the application/database definition generator (ADG) interface handle dynamically detects application and database requirements and defines the computing environment for the data type translator (DTT), the application framework (IMO-A), and the object handler (IMO-H).

In the object definition method, the data type translator (DTT) defines the data type dependencies for the intelligent molecular object generator (IMO-G) and object handler (IMO-H) according to the applications and database environment defined by the application/database definitions generator (ADG).

In the object creation method, the intelligent molecular object generator (IMO-G) extracts relevant data information, routes real-time data from ongoing data acquisitions and transforms device outputs and heterogeneous data types to intelligent molecular object (IMO) data. Next, the object standardization technique (IMO-ST) normalizes the data by calibration according to standardized empirical criteria.

In the representation method for integrated data management and analysis, the application framework (IMO-A) provides integration and access protocols to heterogeneous applications and databases on the object level. Simultaneously, the object handler (IMO-H) enables real-time management and analysis of intelligent molecular object (IMO) data through integrated meta-data tags and pointers called by and sent to the master query component (MQC) and presented via the unified presentation layer (UPL).

Methods are provided to define and describe the architecture for user interaction with and data handling of interactive, intelligent molecular object (IMO) data.

A set of user interaction and environment definition protocols are described comprising:
 a unified presentation layer (UPL), which provides a web-enabled graphical user interface to integrate components of other applications or devices;
 a versatile, integrated handling tool to access and present the object data within this user interface layer;
 a user definition and administration (UDA) shell containing mechanisms to issue and regulate access privileges within the entity of heterogeneous data network environments for the objects;
 a master query component (MQC) which presents security and access protocol to the presentation layer and fields user queries and commands for data acquisition, retrieval, or analysis;

an application/database definition generator (ADG) to act as an automated interface querying application and database requirements and to dynamically define the computing environment to generate the IMO data; and, a data type translator (DTT) module which automates the query of application and database requirements and defines the data type dependencies for the intelligent molecular object generator described above.

Object representation definitions are provided, which govern data preparation, data interaction and data presentation within different object layers to create state-relevant real-time updates in accordance with generic data type conventions required by detected and/or user defined applications, databases, and analytical environments.

These representations are comprised of:

an object generator which automates transformation of data from laboratory devices and/or heterogeneous data types into the intelligent molecular object (IMO) data in real-time. Simultaneously, this object generator refreshes and updates the object state history;

an object standardization technique comprised of a module which automates the normalization of data by calibration with standardized empirical criteria;

an application framework for integration and access protocols to heterogeneous applications and databases on the object level; and, an object handler which enables management of the intelligent molecular object (IMO) data through integrated meta-data tag and pointers.

Through provision of the components and modules, real-time data flow to and from the IMO data is completely described, governed, controlled, secured, monitored and data stream is minimized to provide means for non-redundant, global and selective real-time querying and reporting.

It is evident from the above description, that this object management architecture allows for efficient real-time processing of complex, multidimensional, interdependent queries by providing the infrastructure on both, user-interface level and object-interaction level, to allow for a comprehensive analysis of otherwise inaccessible, inconsistent data sets.

In light of the description provided relative to the overall architectural platform and this additional detailed description, several exemplary embodiments are now described for this aspect of the invention by way of example, but not limitation.

In one aspect, the invention provides system, structure, and method for a set of user interaction, object and environment definition protocols for intelligent molecular objects (IMO). It also and alternatively provides a set of object representation definition protocols to prepare and present data objects for interaction within heterogeneous environments, a Unified Presentation Layer (UPL) providing a web-enabled graphical user interface which integrates components and/or modules from diverse applications, laboratory systems environments, and acts as handler for intelligent molecular object (IMO) data; a User Definition and Administration (UDA) shell to set up and govern access privileges within heterogeneous data network environments; a Master Query Component (MQC) which presents security and access protocol to the presentation layer and fields user queries and commands for data acquisition, retrieval, or analysis; and an Application/Database Definition Generator (ADG) interface which automates the query of application and database requirements and defines the computing environment for the Data Type Translator (DTT), and the Application Framework (IMO-A). This Data Type Translator (DTT) may be further characterized to define the data type dependencies for the Object Generator (IMO-G) according to the applications and database environment defined by the Application/Database Definition Generator (ADG). The invention further provides an Object Generator (IMO-G) which automates transformation of heterogeneous data sources and types into Intelligent Molecular Object (IMO) data in real-time. Simultaneously, this object generator refreshes and updates the object state history. In another aspect, the invention provides an Object Standardization Technique (IMO-S), which automates the normalization of data by calibration with standardized empirical criteria; an Application Framework (IMO-A) which provides integration and access protocols to heterogeneous applications and databases on the object level. An Object Handler (IMO-H), which enables management of Intelligent Molecular Object (IMO) data through integrated meta-data tag and pointers. These structures, components, elements, and techniques, may be used separately or in any combination even though such combinations are not specifically described here.

The following examples are offered by way of illustration and not by way of limitation.

Data from protein expression studies based on 2-dimensional gel electrophoresis (2 DE) are complex to interpret due to the limited reproducibility of the experimental procedure, which typically does not allow for direct comparisons regarding spot position and quantity. Within the IMO technology, such object queries can be performed in real-time at an individual spot level. The attached images of the user interface handling input/output operation between the intelligent molecular objects demonstrate the effective, interactive real-time answer generation process.

Figure 13:
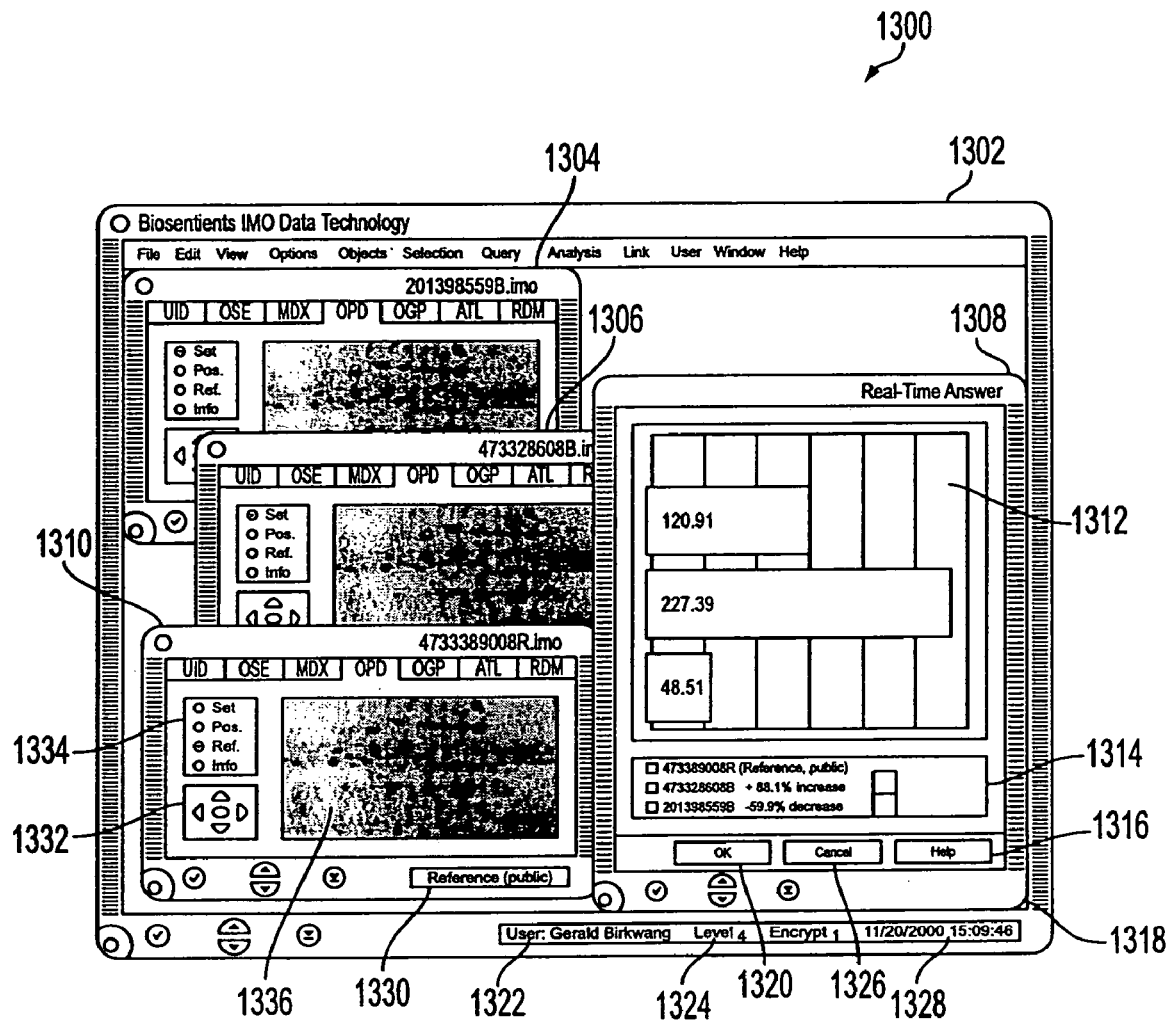
FIG. 13 is a representation of the unified graphical user interface for IMO technology.

FIG. 13 is a representation of the unified graphical user interface for IMO technology. The depiction is a representation of the general graphical user interface for interaction with intelligent molecular object (IMO) data. The dynamically defined menu bar shows extensible options in a standard order, consisting of, but not limited to, drop-down menu items such as file, edit, view, options, objects, selection, query, analysis, link, user, window and help-functions. Within the common user interface window, several independent sub-windows define the intelligent molecular objects, query and/or analysis tools and the real-time answer window, which presents the relevant results in their significance numerically and/or graphically.

Figure 14:
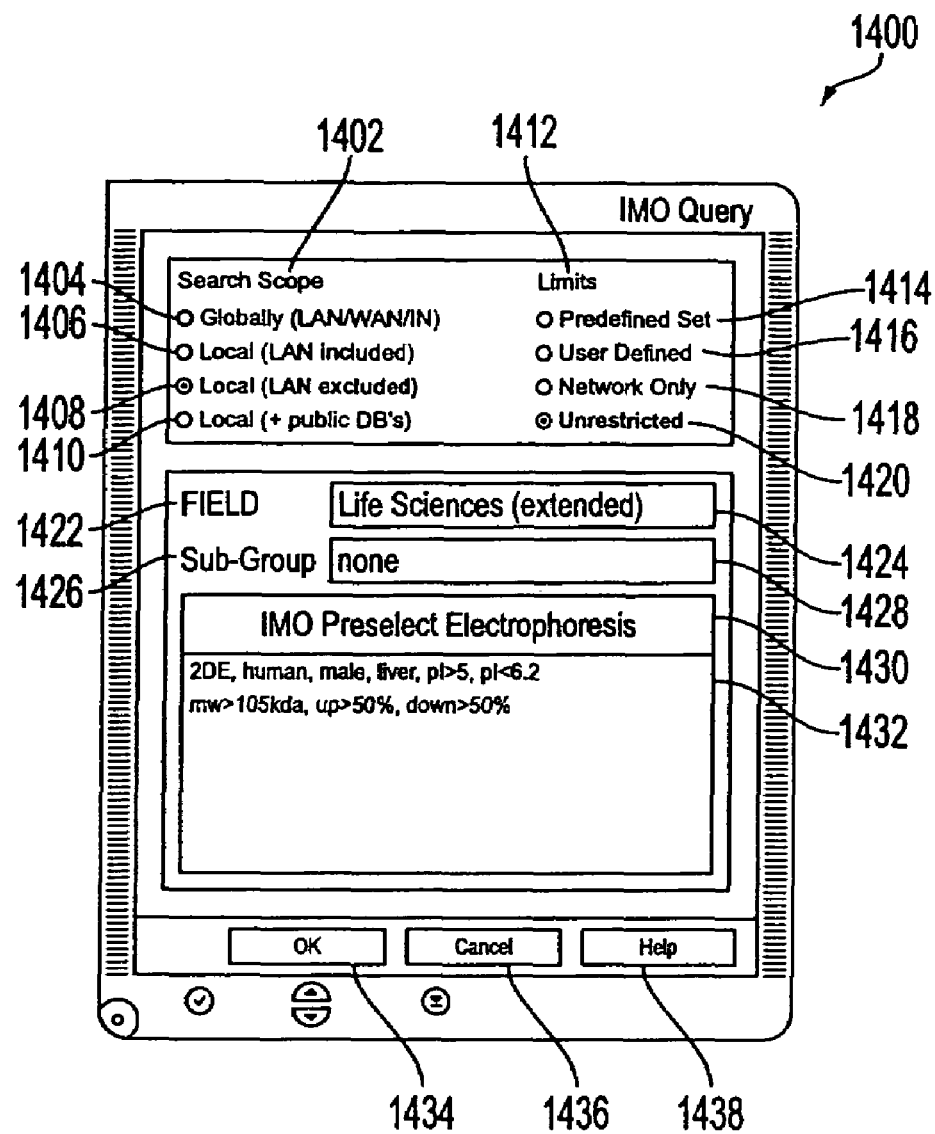
FIG. 14 is a representation of a query dialog utilizing the IMO data handling features.

FIG. 14 is a representation of a query dialog utilizing the IMO data handling features. The depiction below is a representation of a typical query utilizing intelligent molecular object (IMO) technology. Such queries can be performed using pre-definable templates, subsets of common, industry-specific questions, and/or by free form, user-defined entries.

VI. Data Pool Architecture for Intelligent Molecular Object Data in Heterogeneous Data Environments with High Data Density and Dynamic Application Needs In the Intelligent Data Pool aspect of the invention, structure and methods are described herein for meta-data enhanced storage of Intelligent Molecular Object (IMO) data within defined intra-pool subsets. Methods are provided for: pool boundary protocol definitions; meta-data query definitions; and pool content access definitions.

In the pool boundary protocol method, the intra-pool security authentication (iPSA) module authenticates intra-pool data requests according to user login and object data identification. Next, the intra-pool availability monitor (iPAM) and intra-pool exchange protocol (iPEP) presents intra-pool relationships and availability to the authenticated user. Simultaneously, the object integrity assessment (OIA) module assesses object integrity for security and quality assurance/quality control and the intra-pool integrity assessment (iPIA) module assesses data integrity within defined intra-pools for security and quality assurance/quality control.

In the meta-data query method, the real-time meta-data link (RML) component provides for rapid relevant data access based on query parameters and global object meta-data index (MDX) content. Simultaneously, the object-to-object query (OQM) component provides for rapid query optimization based on data object intercommunication regarding query parameters and global object meta-data index (MDX) content. Depending on query parameters, an iPool-to-iPool Query (PPQ) component may be called, which provides for query optimization based on intra-pool data intercommunication regarding query parameters and global object meta-data index (MDX) content contained within more than one intelligent object intra-pool (IOP).

In the pool content access method, the aggregate meta-data index generator (aMDX) provides for meta-data index generation of aggregated intelligent molecular object meta-data, based on query parameters. Simultaneously, the aggregate real-time significance generator (aRSG) provides for significance detection of values located within the global data pool based on query parameters and global object meta-data index (MDX) content. Next, the object property-selective pre-sorting tool (IMO Zoomer) organizes meta-data index based object relationships within individual iPools to allow for real-time result aggregation and viewing and real-time exclusion of irrelevant object data layers. In a further aspect, these structures, methods, and functions operate in synergistic manner to provide advantageous query and retrieval operations and provide a business method and operating model for accessing complex biological, life science, chemical, and other bioinformatics information.

Data Pool architecture and methods are provided to define and describe a meta-data enhanced organization structure for Intelligent Molecular Object (IMO) data relationships and analytical resource accessibility.

The data pool boundary methods and definitions described herein provide security-, boundary- and integrity-protocols for secure access to and integration of global and/or local data pools.

A set of pool boundary protocols are provided, comprising of:
  an iPool Security Authentication (iPSA) module, which authenticates and permits or rejects intra-pool data requests according to user login and object data identification;
  an iPool Availability Monitor iPAM) and an iPool Exchange Protocol (iPEP) which governs intra-pool relationships and supports access and exchange commands;
  an Object Integrity Assessment (OIA) module which assesses object integrity for security and quality assurance/quality control and which provides alerts regarding object validation status;
  an iPool Integrity Assessment (iPIA) module which assesses data integrity within a defined intra-pool for security and quality assurance/quality control and which provides alerts regarding iPool validation status.

The data pool architecture and methods defined herein enable Intelligent Molecular Objects (IMOs) to communicate via active object algorithms, which include, but are not limited to, automated meta-data indexing, object-to-object query and intra-pool-to-intra-pool query protocols.

A set of data pool query protocols are provided, comprising of:
  a Real-time Meta-data Link (RML) component which provides for rapid relevant data access based on query parameters and object meta-data index (MDX) content;
  an Object-to-Object Query (OQM) component which provides for query optimization and parallel processing based on data object intercommunication regarding query parameters and global object meta-data index (MDX) content;
  an iPool-to-iPool Query (PPQ) component which provides for parallel processing and query optimization based on intra-pool data intercommunication regarding query parameters and global object meta-data index (MDX) content contained within more than one intelligent object intra-pool (IOP).

The data pool architecture and methods defined herein provide content access and presentation definitions for significance detection, result aggregation and results generation.

Further, data pool content access and presentation protocols are provided, comprising of:
  an Aggregate Meta-data Index Generator (aMDX) which provides for meta-data index generation of aggregated intelligent molecular object meta-data, based on query parameters;
  an Aggregate Real-time Significance Generator (aRSG) which provides for significance detection of values located within the global data pool based on query parameters and global object meta-data index (MDX) content;
  an object property-selective pre-sorting tool, the IMO Zoomer, which organizes meta-data index based object relationships within individual iPools to allow for real-time result aggregation and real-time exclusion of irrelevant object data layers.

Through provision of the architecture, methods, and modules, the infrastructure is provided for secure, unified object storage and object-to-object and intra-pool-to-intra-pool query-based interaction, to allow for a comprehensive real-time analysis of otherwise inaccessible, inconsistent data sets.

It is evident from the above description, that the data pool architecture and methods described above allow for efficient real-time processing of terabytes of complex, multidimensional, interdependent data, thereby providing real-time answers to queries within heterogeneous data environments with high data density and dynamic application needs.

In light of the description provided relative to the overall architectural platform and this additional detailed description, several exemplary embodiments are now described for this aspect of the invention by way of example, but not limitation.

In one aspect, the invention provides system, architecture, structure, and method for an Intelligent Object Pool (IOP). This IOP may be further defined to include subsets of Intra-Pools (iPools) for Intelligent Molecular Object (IMO) data architecture. In another aspect, the invention provides a Set of Pool Boundary Protocol definitions, describing boundaries, integrity and persistence of Intelligent Molecular Object (IMO) relationships. In another aspect, the invention provides a Set of Meta-data Query definitions, consisting of, but not restricted to, interactive presorting and exclusion algorithms, object clustering, a meta-data linking component, and object-to-object interaction definitions. In another aspect, the invention provides a Set of Pool Content Access definitions, consisting of, but not restricted to, object-to-analysis tools interactions, result merging algorithms, learning algorithms and a real-time answer generator. In another aspect, the invention provides a Pool Boundary Protocol definition, consisting of an iPool Security Authentication (iPSA) module to authenticate intra-pool data requests according to user login and object data identification. In yet another aspect, the invention provides a Pool Boundary Protocol definition, consisting of an iPool Availability Monitor (iPAM) and an iPool Exchange Protocol (iPEP), which govern intra-pool relationships. In still another aspect, the invention provides a Pool Boundary Protocol definition, consisting of an Object Integrity Assessment (OIA) module to assess object integrity for security and quality assurance/quality control. In even still another embodiment, the invention provides a Pool Boundary Protocol definition, consisting of an iPool Integrity Assessment (iPIA) module to assess data integrity within a defined intra-pool for security and quality assurance/quality control. In a further embodiment, the invention provides a Meta-data Query definition, consisting of a Real-time Meta-data Link (RML) component, which provides for rapid relevant data access based on query parameters and global object meta-data index (MDX) content. In one embodiment, the Meta-data Query definition, comprises an Object-to-Object Query (OQM) component, which provides for rapid query optimization based on data object intercommunication regarding query parameters and object meta-data index (MDX) content. In the same or a different embodiment, the Meta-data Query definition, comprises an iPool-to-iPool Query (PPQ) component, which provides for query optimization based on intra-pool data intercommunication regarding query parameters and global object meta-data index (MDX) content contained within more than one intelligent object intra-pool (IOP). The invention further provides a Pool Content Access definition, consisting of an Aggregate Meta-data Index Generator (aMDX), which provides for meta-data index generation of aggregated intelligent molecular object meta-data, based on query parameters; a Pool Content Access definition, consisting of an Aggregate Real-time Significance Generator (aRSG), which provides for significance detection of values located within the global data pool based on query parameters and global object meta-data index (MDX) content; and, a iPool Content Order definition, consisting of an object property-selective pre-sorting tool, the IMO Zoomer, which organizes meta-data index based object relationships within individual iPools to allow for real-time result aggregation and real-time exclusion of irrelevant object data layers. These structures, components, elements, definitions, techniques, and the like may be used separately or in any combination even though such combinations are not specifically described here.

The following examples are offered by way of illustration and not by way of limitation.

Data from a local subset (intra-pool, iPool) of Intelligent Molecular Objects (IMOs) were queried against specific protein expressions based on 2-dimensional gel electrophoresis (2 DE) data. During the real-time answer-finding process, object-to-object interactions are represented via a graphical iPool Viewer, which also accesses relevancy of individual result contributions to generate a unique, exact, relevant real-time answer.

Figure 15:
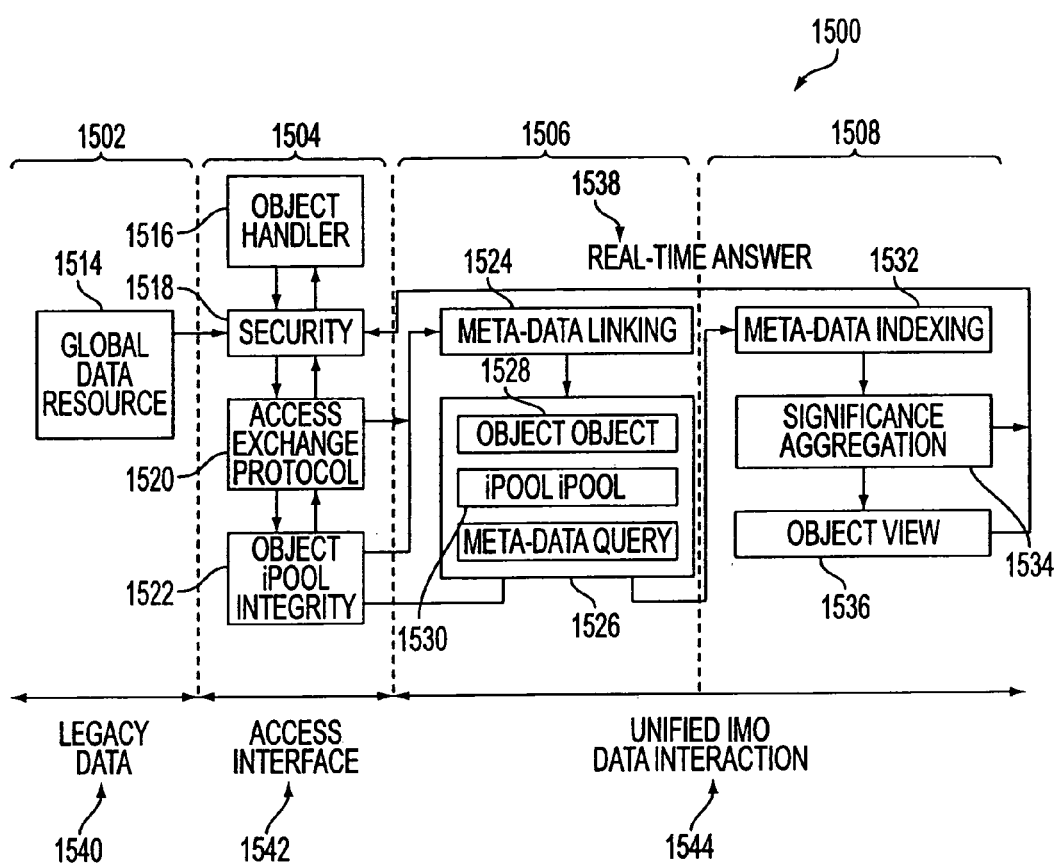
FIG. 15 depicts a representation of the process model for the intelligent molecular object pool (IOP).

FIG. 15 depicts a representation of the process model for the intelligent molecular object pool (IOP). The depiction represents the process model for the intelligent molecular object pool (IOP). Data from a global data resource are passed through an access interface consisting of a security layer, a set of access and/or exchange protocols and integrity assessment procedures onto the intelligent molecular objects (IMO). The pathways involved in unified IMO data interaction to lastly generate the real-time answer and pass it back through security to the object handler for output are outlined in the diagram.

Figure 16:
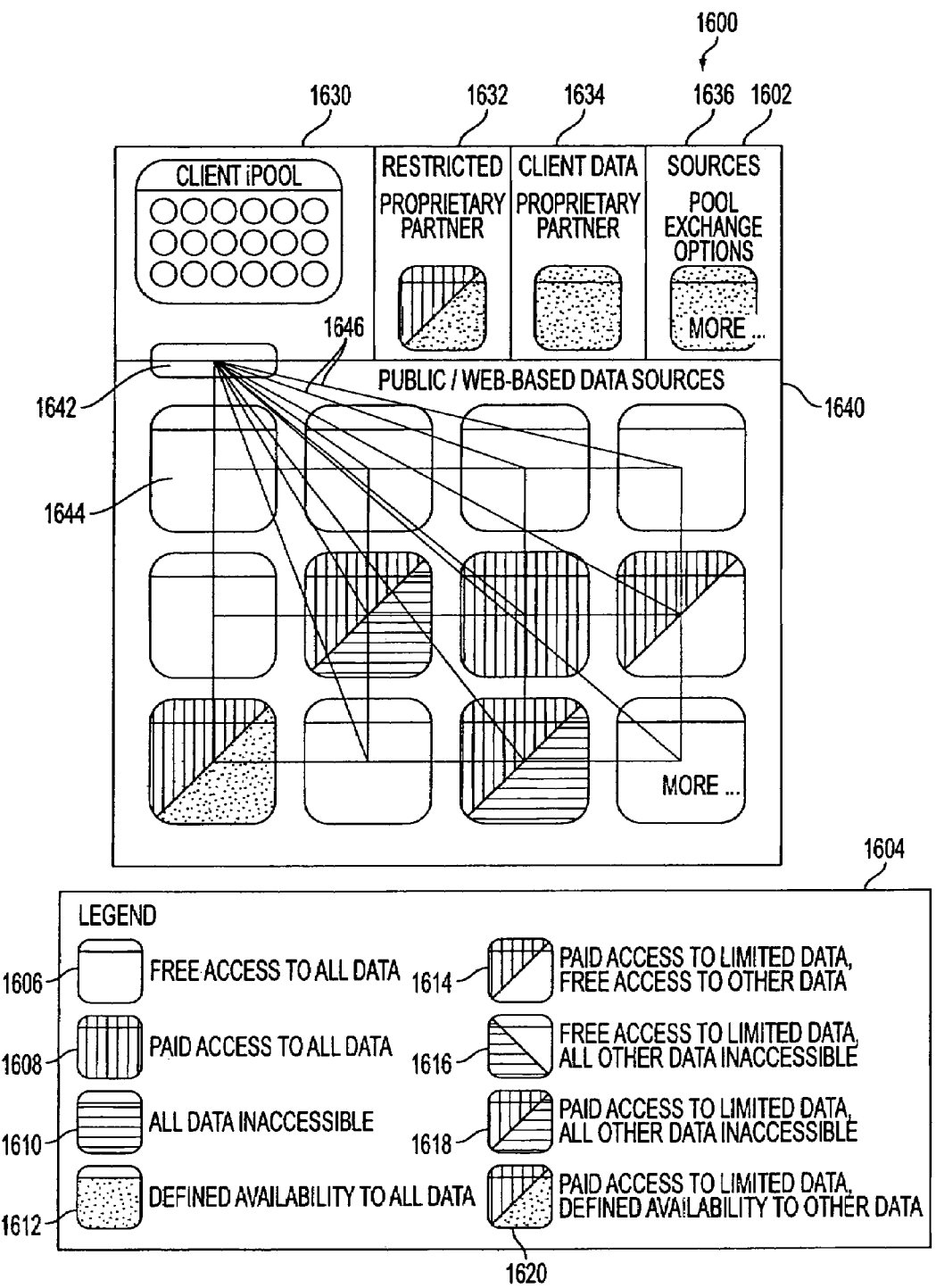
FIG. 16 depicts a chart representation of intra-pool (iPool) relationships and intelligent molecular object (IMO) relationships within the iPool.

FIG. 16 depicts a chart representation of intra-pool (iPool) relationships and intelligent molecular object (IMO) relationships within the iPool. In a global, heterogeneous environment, data from diversified sources are governed by access definition protocols to allow for dynamic data exchange. The chart below depicts those relationship on an intra-pool (iPool) level and the access definition for individual intelligent molecular objects (IMOs) within the iPool and public and/or web-based global data sources. The upper part (in yellow-red) of the diagram depicts data within intranets, LANs and the like, while the lower, larger part (blueish-grey in the color figures) of the diagram contains several different forms of public/web-accessible data sources.

Figure 17A:
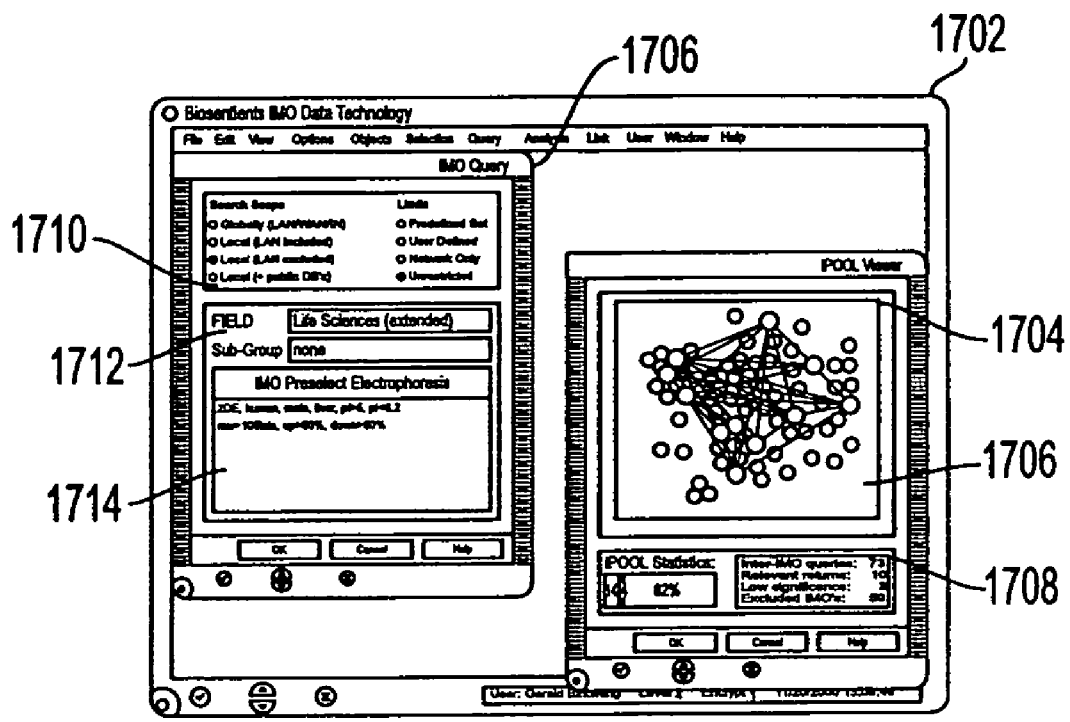
FIG. 17 depicts a GUI screen representation within the unified presentation layer (UPL) concept, showing a graphical view of object intra-pools and their data subsets and a dendrogram representation of dependencies and similarities of object properties based on meta-data indexed results.
Figure 17B:
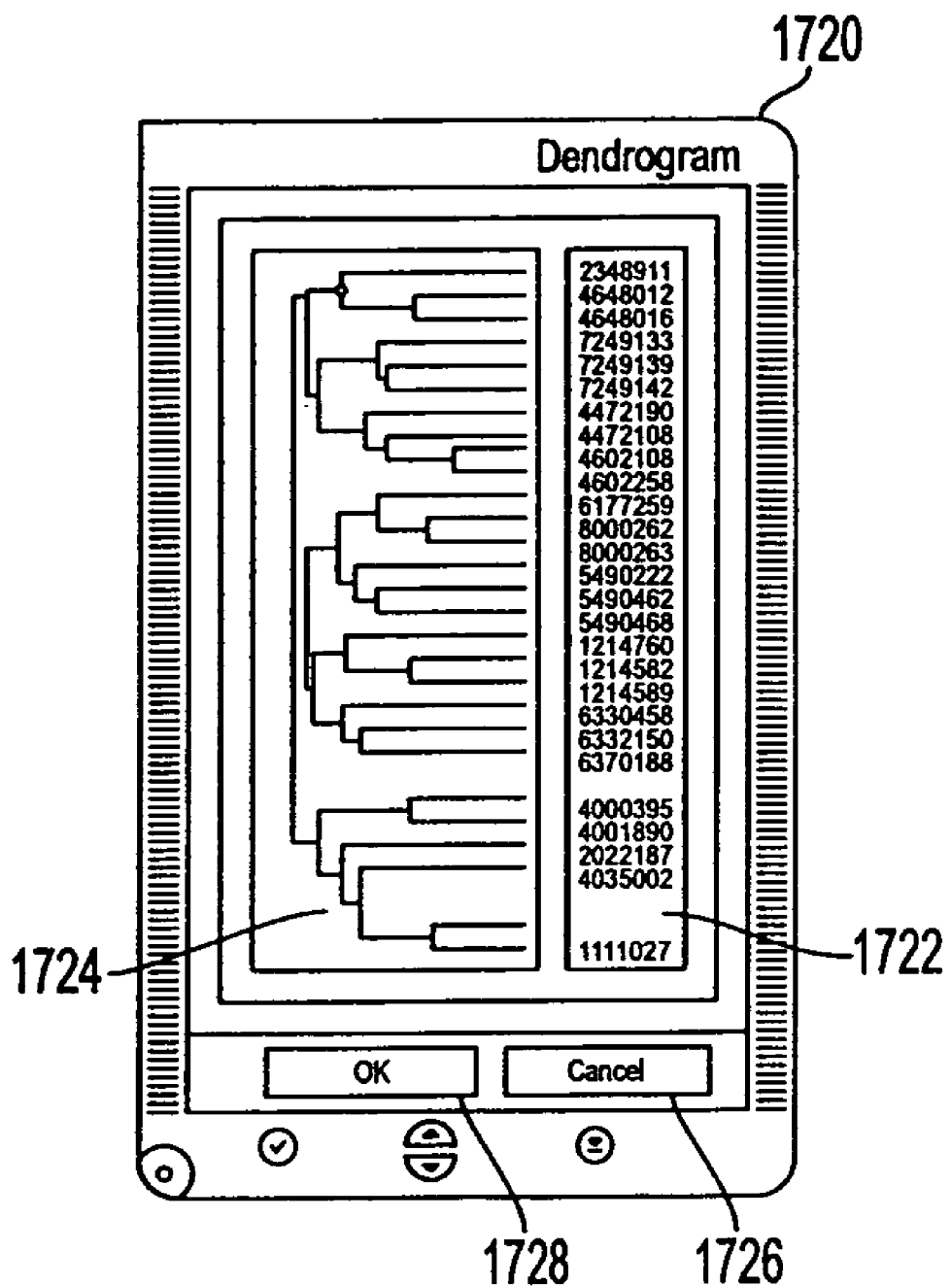
Figure 17C:
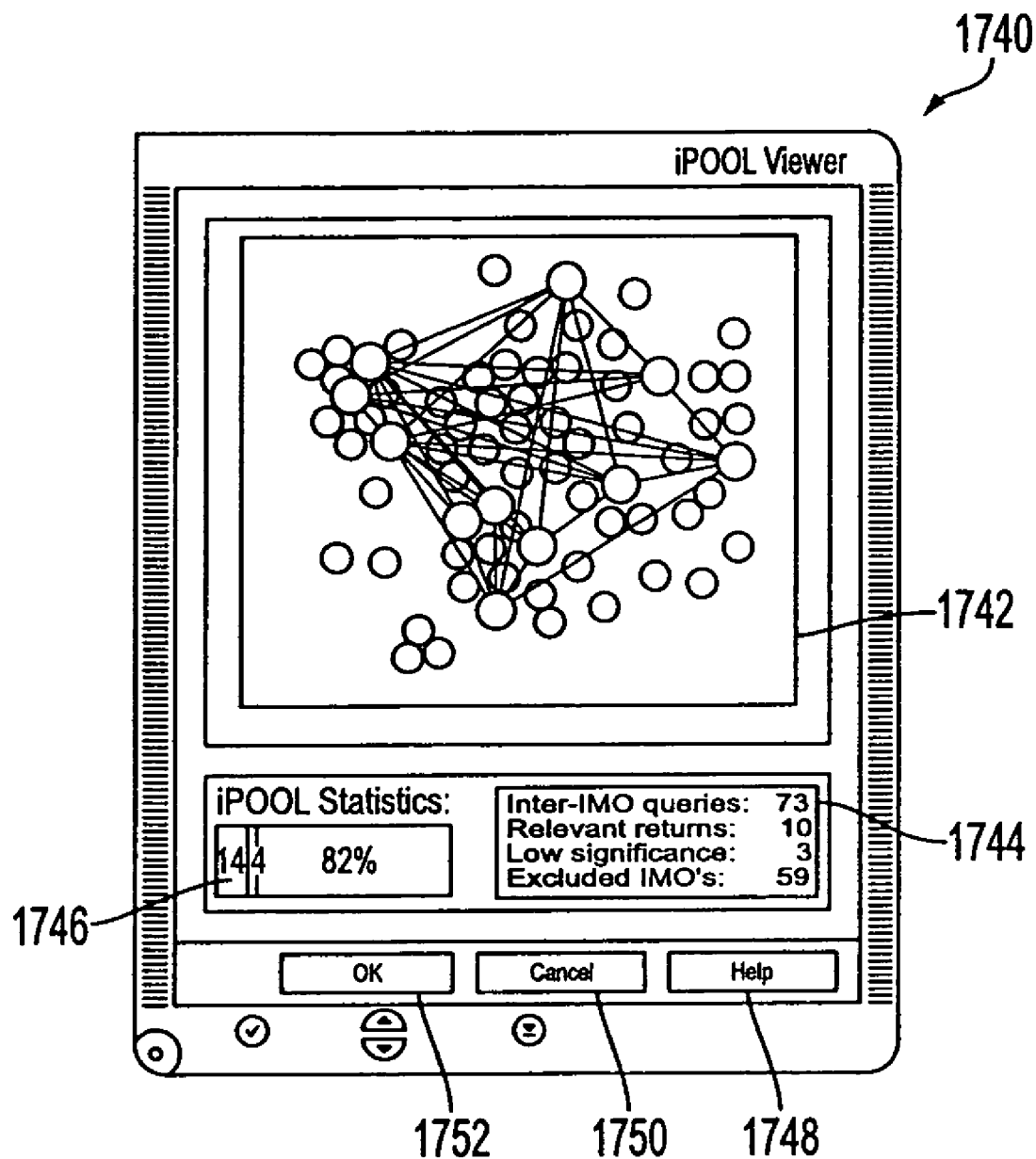

FIG. 17 (FIG. 17A, FIG. 17B, FIG. 17C) depicts a set of GUI screen representations within the unified presentation layer (UPL) concept, showing a graphical view of object intra-pools and their data subsets and a dendrogram representation of dependencies and similarities of object properties based on meta-data indexed results. The depiction is a representation of the graphical user interface window within the unified presentation layer (upper smaller image) displaying the intra-pool relationships, the iPool Viewer (lower detail window image). Interactions between individual intelligent molecular object (IMO) data within the set of objects are outlined in the upper part of the display. Query-relevant object interactions are depicted in green, those with lower confidence level in blue and such objects, which are irrelevant to the query within the result-finding process are shown in red. The lower part of the window includes graphical (left side) and numerical (right side) summary information about the iPool objects contributions.

Operating and Business Model Providing Information Services

Among its inventive aspects, the invention provides a revolutionary new information technology platform that places the power (in terms of response time to complex queries and analytical requests utilizing current tools, such as a common query in bioinformatics for detection of spots in a 2-D Electrophoresis gel) of an entire floor of clustered servers or 'massively parallel mainframe' computers (e.g. IBM, COMPAQ, or the like) at the hands of any scientist or consumer, for that matter, with a computer and a connection to the web. As a result, information processing, management and storage in every field imaginable (Life Sciences, Agribusiness, Large Scale Manufacturing, Physics Imaging, and many more) are dramatically and revolutionarily more efficient and cost effective.

The inventive system, method, and business model is projected toward an initial market in the Life Sciences industries as a result of internal expertise and a tremendous and growing need for the kind of time efficiency and cost effectiveness that our IT Platform will provide.

To further facilitate the need of Life Science and Life Scientist, the invention provides developments and advances toward a number of product modules (typically implemented as computer program software for execution on computer systems) ranging from Drug Discovery, Genomics, Proteomics to Metabolism product modules, that will reside upon the platform and thereby enable the dramatic shortening of timelines for new drug development and gene therapies (while also providing for rapidly, validated diagnosis and treatment) in a Real-Time and cost effective manner. The abbreviated timelines will, in turn, provide cost savings for each new drug to the tune of at least $200 million dollars, while facilitating sales, based on earlier than expected market entry, upwards of $2 billion, for each new drug.

These IT platforms will become a standard, particularly as purveyors of solutions for substantially improved drug discovery, via its various Drug Discovery, Genomic and Proteomic product modules.

The motivation for the platform architecture and its associated methods and procedures has arisen largely because, as a result of the human genome project and other related activities (genomics and proteomics), Biotech and Pharmaceutical companies are drowning in a flood of information, information which may hold the key to powerful and valuable new drug discoveries and gene therapies.

Currently, Biotechology and Pharmaceutical companies are spending upwards of $40 billion each year to sift through this information in order to uncover new drug candidates and potential gene therapies. Despite the vast sums of money being spent, the task of finding new drug candidates and gene therapies remains daunting, costly and highly inefficient.

Some reasons for this can be traced to a number of factors, several of which include: a variety of different types and kinds of databases; applications and systems that cannot communicate with one another; the enormous cost to retool a company's existing information technology platform; the scarcity of bioinformatics specialist; and, the lack of appropriate analysis tools.

As a result, Biotechnology and Pharmaceutical companies are facing three critical issues. The pressure to reduce cost, to speed up the entire process for new drug development and to recover R&D cost more quickly via the sales of new drugs. To date, this remains a wholly unrealized goal.

As a part of the solution, the inventive IMO IT platform provides Biotech and pharmaceutical companies with the ability to quickly and cost effectively sort through the growing mass of information to discover and produce drugs in vastly reduced time periods and at greatly reduced cost. It will be possible as a result of the IMO™ IT platform and drug discovery, proteomics and genomics modules for Biotech and Pharmaceutical companies to shorten the drug discovery process by 2 to 4 years and save upwards of $200 million. Additionally, the various Biotech and Pharmaceutical companies will benefit from earlier than expected revenues (several billion dollars), as a result of reduced development time and thus earlier than anticipated market entry for each new drug.

The inventive system and methods therefore also provide or support a number of new and novel business model and operating model innovations that satisfy the needs of the information community as well as provide revenue. Forming corporate strategic relationships are part of this overall concept.

Business development efforts related to the inventive technology include marketing the inventive products and services to Biotech and Pharmaceutical research companies initially, and to Life Science companies, in general.

Heretofore, the major participants in the field of Biotechnology software for data analysis have comprised the following three categories: Legacy Data Warehouses, data marts, ERP data mining tool companies, which provide proprietary applications and databases; Applications Service Providers (ASPs), Portals and other web-enabled service providers; and Network Integration Providers, which provide network integration of public databases, proprietary data and applications as well as support for local/remote collaboration and decision-making.

These established companies, have been, in general, committed to legacy software, narrowly useful web-based technology, or piecemeal component-based integration solutions, which have depended and continue to depend on expensive mainframe, server cluster, and hardware-enabled "parallel processing" computing to provide their analytical product.

As of yet, no clear leader has emerged to meet the demand for innovative software solutions within this rapidly expanding field, and therefore there remains a need for a more innovative and satisfactory solution.

Embodiments of the inventive system, method, and business model will generate revenue from, for example, at least one or more of the following areas; (1) the sale and licensing of its IT Platform, (2) the sale of its various Drug Development, Genomics, Cheminformatics and Proteomics modules, (3) the sale and licensing of its data-pool assets, (4) royalties from strategic collaborations, and (5) internal use of the IT Platform for production of valued information such as for internal drug discovery or monitoring of such as public health data. Other revenue streams are also contemplated.

Several exemplary application areas are now described by way of example. While the above referenced related patent applications have described innovations in information technology, especially for processing of high numbers of heterogeneous high-density data in heterogeneous computing environments, and more particularly in biotechnology, pharmaceutical, chemical, and life science environments, the invention is not so limited. The systems, methods, interfaces, engines, procedures, functions, algorithms, and other aspects of the invention as described here and in the related applications that are incorporated by reference may advantageously be applied to and/or used in conjunction with information systems generally, physics imaging and analysis, intelligence integration and analysis, large scale manufacturing, agriculture and agribusiness, geographic information systems (GIS), the food industry, epidemiology, large scale forensics, economics and financial systems, health and human services, medical systems, as well as many other fields in which large amounts of data are involved.

In the field of Information Systems, applications of the inventive structure and method include but are not limited to Information Technology (IT) Platform(s), B2A infrastructure, database technology, and platform back-ends, among others. Some of the value in this area includes but is not limited to Flexible, Efficient, and Scalable Systems Integration; Data-enabling for Fast and Secure Data Access and Management; and Scalable and Efficient Applications Development Environment. Computer, network, and information systems providers may benefit from aspects of the invention.

In the field of Physics Imaging and Analysis, applications of the inventive structure and method include but are not limited to Groundwater, Oil, Mineral Exploration, Mining, Mapping, and Real-time Analysis. Some of the value in this area includes but is not limited to Added Efficiency and Functionality for Remote, Magnetic and Sonic Imaging and Analysis, Reduced Exploration Costs, and Increased Predictive Accuracy for Reduced Extraction Footprint. Organizations such as NASA, the Department of Energy, an mineral and resource exploration organizations may benefit from aspects of the invention.

In the field of Large Scale Manufacturing, applications of the inventive structure and method include but are not limited to Just-in-time (JIT) Inventory Management, Process Management, Robotics, and CAD/CAM. Some of the value in this area includes but is not limited to Improved Market, Acquisition and Inventory based on Global Data Access, Flexible and Scalable Process and Infrastructure Management, Real-time, and Integrated Process Optimization. Automobile manufacturers, chemical manufacturers, semiconductor manufacturers, and other large scale material and manufacturing organizations may benefit from the inventive technology.

In the field of Agribusiness, applications of the inventive structure and method include but are not limited to GMO's, Crop Engineering, Seed Banks and Animal Breeding. Some of the value in this area includes but is not limited to Enhanced Bioengineering Applications, Automated QA/QC, Integrated GLP/GMP, Inventory and Process Flow Automation, and Real-time Supply Chain Management. Chemical, textile, and other food research and production organizations may benefit from the inventive technology in this area.

In the Food Industry, applications of the inventive structure and method include but are not limited to Modified Additives, Food Instantization, Food and Foodstuffs processing, Manufacturing Process Design and Automation, and Inventory and Product Distribution. Some of the value in this area includes but is not limited to Enhanced Bioengineering Applications, Automated QA/QC, Integrated GLP/GMP, Inventory and Process Flow Automation, and Real-time Supply Chain Management, among others. Consumer food producers, processors, and packagers will benefit from such technology.

In the field of Epidemiology, applications of the inventive structure and method include but are not limited to Disease Studies; toxicology studies and analysis, and disease Outbreak Prevention. Some of the value in this area includes but is not limited to its Real-time capabilities, and its ability to provide Predictive Modules for Multidimensional Disease Studies and Diagnostics. For example, the Center for Disease control (CDC), the Department of Health and Human Services (DHHS), and various governmental and environmental laboratories may benefit from such technology.

In the field of forensics, particularly Large Scale Forensics, applications of the inventive structure and method include but are not limited to Fingerprint, DNA, and Materials Analysis, and Real-time Data Integration and Access. Some of the value in this area includes but is not limited to Real-time Access to Global Data Records, On-site Fingerprint, Photo Searching, and DNA matching. Law enforcement agencies such as the FBI, Interpol, and other investigative and law enforcement agencies will benefit from the technology, and in addition such organizations such as insurance companies and health maintenance organizations will benefit.

Therefore it will be appreciated that the invention is not limited to any particular field or application; rather, aspects of the invention may be applied to information technology generally where large amounts of heterogeneous data or information are involved.

FURTHER EMBODIMENTS

Numerous embodiments have been described for several different aspect of the invention. We now collect and highlight selected ones of these embodiments that have particular significance, though none necessarily represents the preferred embodiment, and the elements described therein may be combined in different ways than as recited in these particular embodiments:

(1) A software architecture for an information technology platform, comprising of always-on and event-driven, engines, interfaces and processes and using intelligent molecular software data objects for interactive data records.

(2) The architecture in (1), further comprising:

a. an Intelligent Molecular Object (IMO), a versatile, data-enabling software object, which provides for real-time translation, integration, and object-to-object/object-to-analysis tools communication at the object data level, to allow multidimensional, platform-independent complex queries in real-time;

b. an Intelligent Object Handler (IOH), which provides the application framework and user interface for IMO data, for allow for seamless integration of their benefits into legacy systems; and c. an Intelligent Object Pool (IOP), comprising one global virtual data pool comprised of IMO data, which integrates diverse data resources on any system or network to provide result aggregation and instant answers across diversified data subsets.

(3) The architecture in (2), wherein the IMO is further comprised of:

a. a unique identifier (UID), comprising a property pane layer created at IMO generation, which provides typically a 10 byte, alphanumeric unique identification on any system or network;

b. an object access manager (OAM), a property pane layer which governs data security and access according to UID permissions;

c. an object root router (ORR), a property pane layer which contains information to define the origin of the object within the system or network;

d. an interactive content router (ICR), a property pane layer which routes content and results interactively across the system or network;

e. a status management component (SMC), comprised of an object state engine and certain interfaces, which monitors data integrity and command history in GLP/GMP-compliance via state history and governs table lookup actions via the ICR;

f. a property pane controller (PPC), which controls the initiation of IMO communication according to activation by elements 3a through 3d, above;

g. vector subsets (VSS) for automatic, dynamic, or user-defined workspace definitions, which provide vectorized, direct addressing of data subsets for the ICR to minimize network traffic;

h. meta-data indices (MDX), to provide efficient access via dynamically updated meta-data description relevant to extant data queries and definitions;

i. object pane descriptors (OPD), which provide information about each object property pane and their function as required for direct communication with diversified applications and databases;

j. an interface for direct information interchange (DII), which provides the interface to communication at the object level;

k. an application translator link (ATL), which activates the OAM and ICR to determine the property panes for functional presentation and access within a given application or database environment;

l. an object graph preview (OGP) pane, comprising a limited resolution image and graphics viewer for quick graphical data review, particularly of image data and spectral datasets;

m. a raw data matrix (RDM), comprising a property pane which provides the full information subset for any data format or structure; and, n. matrix structure definitions (MSD), which allows for data field mapping and enables vector access to specific data fields.

(4) The architecture in (2), wherein the IOH further comprises:

a. a unified presentation layer (UPL), which provides a web-enabled graphical user interface (GUI) to integrate components and/or modules from diverse applications, laboratory systems environments and to act as handler for IMO data;

b. a user definition administration shell (UDA), which sets ups and governs access privileges to individual IMO data at the user-defined level and is accessible within heterogeneous network environments;

c. at least one engine for data object normalization and standardization, image normalization and standardization, IMO data translation, distributed learning, and knowledge extraction;

d. at least one access interface to and in-between instruments, data and applications, comprising interfaces which include, but are not limited to, direct instrument acquisition and control, application translation, direct object query, result generation, and legacy synchronization;

e. a master query component (MQC), create complex, multidimensional queries, containing pre-defined, configurable subsets of forms commonly used, but not restricted to, in diverse areas of Life Sciences;

f. an IMO generator (IMO-G), an event-driven component to acquire data from heterogeneous data resources, including from ongoing data acquisition, in real-time and transforms device outputs and heterogeneous data types to IMO data;

g. an IMO handle (IMO-H), which enables user management of IMO data utilizing integrated meta-data tags and pointers;

h. an IMO application framework (IMO-A), which provides integration and access protocols to heterogeneous applications and databases on the object level;

i. an application definition generator (ADG), which automates the query and generation of application and defines computing environments for the IMO data translation;

j. at least one data type translator (DTT), which define the data type dependencies for the IMO-G according to the applications and database environments defined by the ADG; and k. an automated application assembly component (AAA), which provides for just-in-time (JIT) module linking.

(5) The architecture in (2), wherein the IOP further comprises:

a. sets of Intra-Pools (iPools), regulated by boundary protocols, which provide data subset management and the define integrity and persistence of IMO relationships;

b. iPool security authentication protocols (iPSA), which authenticates iPool data requests according to user login and object data identification;

c. iPool availability monitoring protocols (iPAM), which define the iPool availability and access requirements of diverse data subsets;

d. iPool exchange protocols (iPEP), which determine and govern iPool data exchange protocols according to user-defined criteria;

e. an object integrity assessment component (OIA), which assess object integrity for security and QA/QC;

f. sets of engines and interfaces to access and generate ranked results within the IOP, including but not limited to an integrity assessment interface, a real-time meta-data linking interface and an iPool-to-iPool query interface;

g. an iPool meta-data index (iMDX), which provides dynamic, automated, and user-defined meta-data indices at the iPool level;

h. an aggregate meta-data index (aMDX), which provides dynamic, automated, and user-defined meta-data indices at the aggregate IMO level, inclusive of all relevant data resources;

i. an object-to-object query meta-data sorter (OQM), to generate temporary tables based on dynamic, automated, and user-defined meta-data indices; and j. an aggregate real-time significance generator (aRSG), which provides for significance detection of values based on query parameters, meta-data indices when relevant, and IMO data ranking.

(6) The architecture in (4), wherein the engines further comprise:

a. an object state engine (OSE), which provides a continuously-running (always on) set of processes, which monitor and govern activities of IMO data, performing real-time recording, updating and logging functions in GLP/GMP-compliant format.

(7) The architecture in (4), wherein the engines further comprise:

a. a set of IMO standardization techniques (IMO-S), comprising engines which provide algorithms for tracking, standardization and/or normalization of object data;

b. an generic object normalization engine (ONE), which extracts variable and non-variable regions within any set of object data and generates a global standard to which all data can be referred;

c. an engine for global image normalization (GIN), which extracts variable and non-variable regions within any set of image data and generates a global standard to which all data can be referred;

d. an object translation engine (OTE), which is comprised of methods and functions for real-time meta-data extraction and table generation of raw data matrix, data object, data field, data structure, data functional information, data type, database type, and application type definitions for the OPD;

e. a distributed learning engine (DLE), which provides algorithms for dynamic, automated, and user-defined hypothesis generation utilizing global data resources; and f. a knowledge extraction engine (KEE), which provides algorithms for dynamic, automated, and user-defined significance discovery and report generation.

(8) The architecture in (5), wherein the engines further comprise:

a. a result aggregation engine (RAE), to validate, assemble, rank and tabulate results passed from the IOH and to generate output reports across diversified data subsets.

(9) The architecture in (3), wherein the interfaces further comprise:

a. a direct information interchange interface (DII), which allows for rapid analysis and results aggregation by providing the interface for object-to-object and object-to-analysis tools via such related interfaces and engines including, but not limited to the OQI, OTE, and the DLE.

(10) The architecture in (4), wherein the interfaces further comprise:

a. a graphical user interface (GUI), utilizing web-enabling standards including but not limited to Java and XML;

b. a direct instrument acquisition and control interface (DIAC), which provides bi-directional real-time communication between the IOH, the IMO and diverse instrumentation;

c. an application translation interface (ATI), to provide automated real-time detection of diverse data and applications and gate bi-directional access to the OTE, thus enabling functional, standardized integration of IMO data within heterogeneous data and applications environments;

d. an object query interface (OQI), comprising an interface for direct information interchange (DII) with IMO data, which initiates query analysis and results aggregation;

e. a result generation interface (RGI)) to provide validated, assembled, ranked and tabulated results to the RAE, thus enabling the generation of output reports across diversified data subsets; and f. a legacy synchronization interface (LSI), to provide persistence and synchronization of offline legacy data.

(11) The architecture in (4), wherein the interfaces further comprise:

a. an iPool integrity assessment interface (iPIAi), to asses data integrity within a defined iPool for security and QA/QC;

b. a real-time meta-data link interface (RML), which provides for rapid relevant data access based on query parameters and MDX information;

c. a pool-to-pool query interface (PPQ), which provides for query optimization based on query parameters and relevant iPool data and meta-data intercommunication; and, d. an IMO Zoomer (IMO-Z), which defines proximity and functional ranking of individual IMO data within the IOP and enables multidimensional IMO data viewing to represent object relationships within the pool and in relationship to other iPools.

(12) An Architecture using interactive Objects for real-time, efficient, multidimensional, interdependent intelligent queries.

(13) An Intelligent Object comprising of a set of functional layers ("Panes").

(14) A methods for creating the Intelligent Objects.

(15) A Unique Object Identifier (UID) Pane within the object, which identifies each object and contains rules for object data security and access permissions.

(16) An Object Root Router (ORR) Pane within the object, which defines the origin of the object within the network.

(17) An Interactive Content Router (ICR) Pane within the object, which defines where content and/or results will be directed within the network.

(18) A Status Management Component (SMC) Pane within the object, which monitors data integrity and command history in G*P-compliant LIMS-style.

(19) A Meta-Data Index (MDX) Pane within the object.

(20) An Object Pane Descriptor (OPD) within the object, which includes an Application/Database Definition Router (ADDR).

(21) An Application Translator Link (ATL) Pane within the object, which includes an Object Access Manager (OAM) for application integration.

(22) An Object Query Interface (OQI) for Object-to-Object Direct Information Interchange (DII).

(23) An Object Graph Preview (OGP) Pane within the object including a limited resolution image/graphics viewer for quick graphical data review.

(24) A Raw Data Matrix (RDM) Pane within the object including a Matrix Structure Descriptor (MSD).

(25) A continuously-running set of processes, comprising an object state engine monitoring and governing any activities of intelligent molecular objects in real-time.

(26) A process component of the object state engine to trigger a module for creating an object if such object does not exist, and assigning a unique identifier to it.

(27) A set of process components within the object state engine, which monitor object activities or transactions with the object and record its activity history.

(28) A process component of the object state engine, which relates activities to Good Laboratory Practices/Good Manufacturing Practices (GLP/GMP)-compliant, laboratory information management system (LIMS)-style experiment data states and validates the current action by assigning a defined state to the object.

(29) A process component of the object state engine, which governs access to the object and object-to-object activities based on security protocols and privilege definitions.

(30) A process component of the object state engine, which maintains status remembering in state-less networks and transmits action consequences back to the backend system.

(31) A process component of the object state engine, which ranks requests for information exchange based on annotation or validation state of the addressed data object.

(32) A process component of the object state engine, which defines vectors to subsets of object data ("the workspace") within the data matrix for dynamic information interchange.

(33) A processing component of the object state engine for handling external query submissions to the object.

(34) A process component of the object state engine, which handles object-to-object query result synchronization.

(35) Event driven sets of processes, comprising an object translation engine to perform automated real-time data translation for integration of intelligent molecular objects within heterogeneous data environments.

(36) A component within the translation engine to determine data object, data field and raw data matrix definitions for intelligent molecular objects and extracting sets of tables to generate corresponding property panes.

(37) A component within the translation engine, which provides data structure and functional information for standardization of non-object data.

(38) A component within the translation engine to carry out data type extraction to determine data access, structural and functional dependencies for intelligent molecular objects.

(39) A component within the translation engine, which provides data type, access, structure and function definition tables for intelligent molecular objects.

(40) A component within the translation engine, which carries out database type extraction to determine database access and structure dependencies for intelligent molecular objects.

(41) A component within the translation engine, which provides database type, access and structure definition tables for intelligent molecular objects.

(42) A component within the translation engine, which carries out application type extraction to determine application type, access and structure for intelligent molecular objects.

(43) A component within the translation engine, which provides application type, access and structure definition tables for intelligent molecular objects.

(44) A component within the translation engine, which provides table lookup to provide real-time translation of the intelligent molecular object within heterogeneous database and application environments.

(45) A component within the translation engine, which provides intelligent molecular object pane descriptors in real-time, according to defined data structure, database, and application requirements.

(46) A set of user interaction, object and environment definition protocols for intelligent molecular objects (IMO).

(47) A set of object representation definition protocols to prepare and present data objects for interaction within heterogeneous environments.
(48) A Unified Presentation Layer (UPL) providing a web-enabled graphical user interface which integrates components and/or modules from diverse applications, laboratory systems environments, and acts as handler for intelligent molecular object (IMO) data.
(49) A User Definition and Administration (UDA) shell to set up and govern access privileges within heterogeneous data network environments.
(50) A Master Query Component (MQC) which presents security and access protocol to the presentation layer and fields user queries and commands for data acquisition, retrieval, or analysis.
(51) An Application/Database Definition Generator (ADG) interface which automates the query of application and database requirements and defines the computing environment for the Data Type Translator (DTT), and the Application Framework (IMO-A).
(52) A Data Type Translator (DTT) as referred to in (6), which defines the data type dependencies for the Object Generator (IMO-G) according to the applications and database environment defined by the Application/Database Definition Generator (ADG) described in (51).
(53) An Object Generator (IMO-G) as referred to in (53), which automates transformation of heterogeneous data sources and types into Intelligent Molecular Object (IMO) data in real-time. Simultaneously, this object generator refreshes and updates the object state history.
(54) An Object Standardization Technique (IMO-S), which automates the normalization of data by calibration with standardized empirical criteria.
(55) An Application Framework (IMO-A) as referred to in (51), which provides integration and access protocols to heterogeneous applications and databases on the object level.
(56) An Object Handler (IMO-H), which enables management of Intelligent Molecular Object (IMO) data through integrated meta-data tag and pointers.
(57) An Intelligent Object Pool (IOP), comprising of subsets of Intra-Pools (iPools) for Intelligent Molecular Object (IMO) data architecture.
(58) A Set of Pool Boundary Protocol definitions, describing boundaries, integrity and persistence of Intelligent Molecular Object (IMO) relationships.
(59) A Set of Meta-data Query definitions, comprising of, but not restricted to, interactive presorting and exclusion algorithms, object clustering, a meta-data linking component, and object-to-object interaction definitions.
(60) A Set of Pool Content Access definitions, comprising of, but not restricted to, object-to-analysis tools interactions, result merging algorithms, learning algorithms and a real-time answer generator.
(61) A Pool Boundary Protocol definition, comprising of an iPool Security Authentication (iPSA) module to authenticate intra-pool data requests according to user login and object data identification.
(62) A Pool Boundary Protocol definition, comprising of an iPool Availability Monitor (iPAM) and an iPool Exchange Protocol (iPEP), which govern intra-pool relationships.
(63) A Pool Boundary Protocol definition, comprising of an Object Integrity Assessment (OIA) module to assess object integrity for security and quality assurance/quality control.
(64) A Pool Boundary Protocol definition, comprising of an iPool Integrity Assessment (iPIA) module to assess data integrity within a defined intra-pool for security and quality assurance/quality control.
(65) A Meta-data Query definition, comprising of a Real-time Meta-data Link (RML) component, which provides for rapid relevant data access based on query parameters and global object meta-data index (MDX) content.
(66) A Meta-data Query definition, comprising of an Object-to-Object Query (OQM) component, which provides for rapid query optimization based on data object intercommunication regarding query parameters and object meta-data index (MDX) content.
(67) A Meta-data Query definition, comprising of an iPool-to-iPool Query (PPQ) component, which provides for query optimization based on intra-pool data intercommunication regarding query parameters and global object meta-data index (MDX) content contained within more than one intelligent object intra-pool (IOP).
(68) A Pool Content Access definition, comprising of an Aggregate Meta-data Index Generator (aMDX), which provides for meta-data index generation of aggregated intelligent molecular object meta-data, based on query parameters.
(69) A Pool Content Access definition, comprising of an Aggregate Real-time Significance Generator (aRSG), which provides for significance detection of values located within the global data pool based on query parameters and global object meta-data index (MDX) content.
(70) An iPool Content Order definition, comprising of an object property-selective pre-sorting tool, the IMO Zoomer, which organizes meta-data index based object relationships within individual iPools to allow for real-time result aggregation and real-time exclusion of irrelevant object data layers.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. All patents and publications referenced herein are hereby incorporated by reference.

We claim:

1. A method of using a data presentation system including a graphical user interface that displays data to a user and accepts inputs from the user, the method comprising:
   a) importing at least one ontology into an ontology data storage accessible by the data presentation system, the ontology representing a formal identity of the data describing relationships in common vocabularies for the data, in order to contextualize the data to allow uniform query of the data;
   b) mapping the at least one ontology onto a presentation layer to provide a reference from data elements to one or more known schemas, which represent dependencies and similarities between data elements, based on meta-data associated with the data elements;

c) displaying the presentation layer, the presentation layer comprising a subset workspace of the displayed data and the mapped ontology from the ontology data storage, the subset workspace comprising a set of data elements having a common relationship;

d) accepting a first set of inputs from the user, wherein the first set of inputs specify selections of positions within the subset workspace; and e) generating an ontology element comprising at least some of the displayed data, based at least in part on the first set of inputs.

2. The method of claim 1, wherein the data is imageable data, and wherein displaying the data to a user comprises presenting the data in a graphical format.

3. The method of claim 2, wherein the imageable data is organized into a plurality of data grouping objects, and wherein each data grouping object comprises a portion of the imageable data and a corresponding set of one or more non-graphical data elements.

4. The method of claim 3, wherein a first data grouping object comprises a first portion of imageable data and a first set of one or more non-graphical data elements, and wherein the first set of one or more non-graphical data elements is generated by an analysis of the first portion of imageable data.

5. The method of claim 3, wherein the ontology element comprises a data grouping object.

6. The method of claim 5, further comprising allowing the user to perform an operation on the set of one or more non-graphical elements in the data grouping object, based on the ontology.

7. The method of claim 6, wherein the operation is an operation selected from a group consisting of:

a normalized comparison of the set of one or more non-graphical elements with a second set of one or more non-graphical elements associated with a second ontology element, the normalized comparison showing similarities between the ontology element and the second ontology element;

a normalized comparison of the set of one or more non-graphical elements with a second set of one or more non-graphical elements associated with a second ontology element, the normalized comparison showing differences between the ontology element and the second ontology element;

an operation showing that at least part of the set of one or more non-graphical elements falls within a specified range;

an operation showing that at least part of the set of one or more non-graphical elements does not fall within a specified range;

an operation showing that the ontology element is related to a second ontology element according to a relationship specified by one or more algorithms;

an operation showing that the ontology element is not related to any other ontology element;

an operation showing that the ontology element is part of another ontology element;

an operation showing that the ontology element is a parent of another ontology element;

an operation showing that the ontology element is a child of another ontology element;

an operation showing that the ontology element is similar to a second ontology element; and an operation showing that the ontology element is not similar to a second ontology element.

8. The method of claim 1, wherein the displayed data is data derived from life science instrument outputs.

9. The method of claim 1, wherein the displayed data is data derived from life science instrument images.

10. The method of claim 1, wherein the specified selections in the first set of inputs are derived from mouse clicks at specified locations on a display in the graphical user interface.

11. The method of claim 1, wherein the ontology element is selected from the group consisting of:

a subject subset;

an object subset; and a relationship definition defining a relationship between a subject subset and an object subset.

12. The method of claim 1, wherein the ontology element comprises a subject subset, and wherein an ontology statement comprises:

the ontology element;

a second ontology element comprising an object subset; and a third ontology element comprising a relationship definition defining a relationship between the ontology element and the second ontology element.

13. The method of claim 11, wherein the first set of inputs identify the subject subset.

14. The method of claim 11, further comprising:

f) performing an iterative query, wherein at least one of the subject subset, the object subset and the relationship definition is defined by the iterative query.

15. The method of claim 1, further comprising:

f) accepting a second set of inputs from the user.

16. The method of claim 15, wherein the second set of inputs comprise annotations, wherein an annotation is a metadata label associated with a position within the subset workspace.

17. The method of claim 16, wherein an ontology statement comprises a subject subset, an object subset, and a relationship definition defining a relationship between the subject subset and the object subset, and wherein the object subset comprises the annotations.

18. The method of claim 15, wherein the second set of inputs identify the object subset.

19. A method of using a data presentation system including a graphical user interface that displays imageable data to a user and accepts inputs from the user, wherein the imageable data is organized into a plurality of data grouping objects, each of the data grouping objects comprising a portion of the imageable data and a corresponding set of one or more non-graphical data elements, the method comprising:

a) importing at least one ontology into an ontology data storage accessible by the data presentation system, the ontology representing a formal identity of the data that describes relationships in common vocabularies for the data, in order to contextualize the data to allow uniform query of the data;

b) mapping the at least one ontology onto a presentation layer to provide a reference from data elements to one or more known schemas, which represent dependencies and similarities between data elements, based on meta-data associated with the data elements;

c) displaying the presentation layer, the presentation layer comprising a subset workspace of the displayed data and the mapped ontology from the ontology data storage, the subset workspace comprising a set of data elements having a common relationship;

d) accepting a first set of inputs from the user, wherein the first set of inputs specify selections of positions within the subset workspace;

e) selecting a data grouping object from the plurality of data grouping objects, based on the first set of inputs, the data grouping object comprising a first portion of the imageable data and a corresponding first set of one or more non-graphical data elements; and f) performing an operation on the first set of one or more non-graphical elements.

20. The method of claim 19, further comprising receiving a second set of inputs from the user, wherein the second set of inputs specify an operation to be performed, and wherein performing an operation on the first set of one or more non-graphical elements comprises performing the operation specified by the second set of inputs.

* * * * *

UNITED STATES PATENT AND TRADEMARK OFFICE
CERTIFICATE OF CORRECTION

PATENT NO. : 7,702,639 B2
APPLICATION NO. : 11/217796
DATED : April 20, 2010
INVENTOR(S) : Robert A. Stanley and Erich A. Gombocz It is certified that error appears in the above-identified patent and that said Letters Patent is hereby corrected as shown below:

On the Title Page, Item (63), insert immediately after Related U.S. Application Data:

--Continuation of application 10/010,086, filed on December 6, 2001, now Pat. No. 6,988,109.
Provisional Application 60/282,991 filed on April 10, 2001.
Provisional Application 60/282,990 filed on April 10, 2001.
Provisional Application 60/282,989 filed on April 10, 2001.
Provisional Application 60/282,979 filed on April 10, 2001.
Provisional Application 60/282,658 filed on April 9, 2001.
Provisional Application 60/282,657 filed on April 9, 2001.
Provisional Application 60/282,656 filed on April 9, 2001.
Provisional Application 60/282,655 filed on April 9, 2001.
Provisional Application 60/282,654 filed on April 9, 2001.
Provisional Application 60/276,711 filed on March 16, 2001.
Provisional Application 60/266,957 filed on February 6, 2001.
Provisional Application 60/264,238 filed on January 25, 2001.
Provisional Application 60/259,050 filed on December 29, 2000.
Provisional Application 60/254,064 filed on December 6, 2000.
Provisional Application 60/254,063 filed on December 6, 2000.
Provisional Application 60/254,062 filed on December 6, 2000.--

Signed and Sealed this

Twenty-first Day of December, 2010

David J. Kappos
*Director of the United States Patent and Trademark Office*